(12) United States Patent
Jacobi et al.

(10) Patent No.: US 10,430,188 B2
(45) Date of Patent: *Oct. 1, 2019

(54) NEXT INSTRUCTION ACCESS INTENT INSTRUCTION FOR INDICATING USAGE OF A STORAGE OPERAND BY ONE OR MORE INSTRUCTIONS SUBSEQUENT TO A NEXT SEQUENTIAL INSTRUCTION

(71) Applicant: International Business Machines Corporation, Armonk, NY (US)

(72) Inventors: Christian Jacobi, Poughkeepsie, NY (US); Chung-Lung Kevin Shum, Wappingers Falls, NY (US); Timothy J Siegel, Staatsburg, NY (US); Gustav E Sittmann, III, Webster Groves, MO (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 540 days.

This patent is subject to a terminal disclaimer.

(21) Appl. No.: 14/143,325

(22) Filed: Dec. 30, 2013

(65) Prior Publication Data

US 2014/0115306 A1    Apr. 24, 2014

Related U.S. Application Data

(63) Continuation of application No. 13/524,105, filed on Jun. 15, 2012.

(51) Int. Cl.
*G06F 9/34* (2006.01)
*G06F 12/123* (2016.01)
(Continued)

(52) U.S. Cl.
CPC ............ *G06F 9/30076* (2013.01); *G06F 9/30* (2013.01); *G06F 9/30047* (2013.01);
(Continued)

(58) Field of Classification Search
CPC .............. G06F 9/3004; G06F 9/30043; G06F 9/30047; G06F 9/30076; G06F 9/34;
(Continued)

(56) References Cited

U.S. PATENT DOCUMENTS

| 4,928,239 A | * | 5/1990 | Baum et al. ................... 711/136 |
| 5,481,688 A | * | 1/1996 | Takagi .......................... 711/208 |

(Continued)

FOREIGN PATENT DOCUMENTS

| EP | 1447745 A2 | 8/2004 |
| WO | WO2007047523 A2 | 4/2007 |

OTHER PUBLICATIONS

Office Action for U.S. Appl. No. 13/524,105 dated Feb. 26, 2015, pp. 1-22.

(Continued)

*Primary Examiner* — David J Huisman
(74) *Attorney, Agent, or Firm* — Steven Chiu, Esq.; Blanche E. Schiller, Esq.; Heslin Rothenberg Farley & Mesiti P.C.

(57) ABSTRACT

Executing a Next Instruction Access Intent instruction by a computer. The processor obtains an access intent instruction indicating an access intent. The access intent is associated with an operand of a next sequential instruction. The access intent indicates usage of the operand by one or more instructions subsequent to the next sequential instruction. The computer executes the access intent instruction. The computer obtains the next sequential instruction. The computer executes the next sequential instruction, whose execution comprises, based on the access intent, adjusting one or (Continued)

more cache behaviors for the operand of the next sequential instruction.

8 Claims, 21 Drawing Sheets

(51) Int. Cl.
  *G06F 9/30* (2018.01)
  *G06F 12/0862* (2016.01)
  *G06F 9/38* (2018.01)
  *G06F 12/0815* (2016.01)
  *G06F 12/126* (2016.01)

(52) U.S. Cl.
  CPC .......... *G06F 9/30145* (2013.01); *G06F 9/34* (2013.01); *G06F 9/383* (2013.01); *G06F 12/0815* (2013.01); *G06F 12/0862* (2013.01); *G06F 12/123* (2013.01); *G06F 12/126* (2013.01); *G06F 2212/6028* (2013.01)

(58) Field of Classification Search
  CPC ...... G06F 9/383; G06F 12/08; G06F 12/0802; G06F 12/0862; G06F 12/0877; G06F 12/12; G06F 12/123
  USPC .......................... 712/225; 711/118, 133, 136
  See application file for complete search history.

(56) References Cited

U.S. PATENT DOCUMENTS

| | | | |
|---|---|---|---|
| 5,551,013 A | 8/1996 | Beausoleil et al. | |
| 5,574,873 A | 11/1996 | Davidian | |
| 5,790,825 A | 8/1998 | Traut | |
| 6,009,261 A | 12/1999 | Scalzi et al. | |
| 6,088,789 A * | 7/2000 | Witt | 712/207 |
| 6,308,255 B1 | 10/2001 | Gorishek, IV et al. | |
| 6,463,582 B1 | 10/2002 | Lethin et al. | |
| 6,526,481 B1 * | 2/2003 | Shen et al. | 711/147 |
| 6,578,111 B1 | 6/2003 | Damron et al. | |
| 6,615,340 B1 | 9/2003 | Wilmot et al. | |
| 2003/0159009 A1 | 8/2003 | Henry et al. | |
| 2009/0157967 A1 | 6/2009 | Greiner et al. | |
| 2011/0078381 A1 * | 3/2011 | Heinrich et al. | 711/122 |

OTHER PUBLICATIONS

Final Office Action for U.S. Appl. No. 13/524,105 dated Jul. 31, 2015, pp. 1-14.

Office Action for U.S. Appl. No. 13/524,105 dated Jul. 7, 2017, pp. 1-14.

Final Office Action for U.S. Appl. No. 13/524,105 dated Jan. 11, 2018, pp. 1-11.

Author Unknown, "X86-64 Instruction Encoding," Apr. 2012, pp. 1-9.

IBM, "z/Architecture—Principles of Operation," IBM Publication No. SA22-7832-08, Aug. 2010, pp. 1-1 thru 1-28; 2-1 thru 2-6; 3-1 thru 3-9; 5-1 thru 5-22; 5-93 thru 5-102; 6-1 thru 6-51 (+ cover sheets).

IBM, "z/Architecture—Principles of Operation," IBM Publication No. SA22-7832-09, Sep. 2012, pp. 7-257 thru 7-258 (+ cover sheets).

* cited by examiner

NEXT INSTRUCTION ACCESS INTENT INSTRUCTION FOR INDICATING USAGE OF A STORAGE OPERAND BY ONE OR MORE INSTRUCTIONS SUBSEQUENT TO A NEXT SEQUENTIAL INSTRUCTION

CROSS REFERENCE TO RELATED APPLICATIONS

This application is a continuation of U.S. patent application Ser. No. 13/524,105, "NEXT INSTRUCTION ACCESS INTENT INSTRUCTION" filed Jun. 15, 2012, the contents of which are incorporated by reference herein in their entirety.

BACKGROUND

The present invention relates, in general, to computer systems, and in particular, to computer system processor instruction processing functionality.

From the 1960s to the present, a type of computer system, because of its essential nature in large-scale computing power, became known as the "mainframe". This mainframe (computer) operates upon a set of principles of operation which state the architecture of the machine by describing the instructions that may be executed on the mainframe.

BRIEF SUMMARY

According to one embodiment, a method, system, and program product is provided. A computer obtains an access intent instruction indicating an access intent. The access intent is associated with an operand of a next sequential instruction. The access intent indicates usage of the operand by one or more instructions subsequent to the next sequential instruction. The computer executes the access intent instruction. The computer obtains the next sequential instruction. The computer executes the next sequential instruction. This execution comprises based on the access intent, adjusting one or more cache behaviors for the operand of the next sequential instruction.

According to one embodiment, the computer stores the access intent in an internal control register.

According to one embodiment, the access intent instruction comprises an access intent operand indicating the access intent.

According to one embodiment, the access intent instruction indicates another access intent. The another access intent is associated with another operand of the next sequential instruction. The another access intent indicates usage of the another operand by the one or more instructions subsequent to the next sequential instruction.

According to one embodiment, the access intent specifies that the operand of the next sequential instruction will be accessed by the one or more instructions subsequent to the next sequential instruction such that: the operand of the next sequential instruction will be accessed by the one or more instructions subsequent to the next sequential instruction for operand store access, the operand of the next sequential instruction will be accessed by the one or more instructions subsequent to the next sequential instruction for operand fetch access, the operand of the next sequential instruction will not be accessed by the one or more instructions subsequent to the next sequential instruction, or a combination thereof.

According to one embodiment, based on the access intent, adjusting one or more cache behaviors for the operand of the next sequential instruction further comprises based on the access intent being a first value, adjusting, by the computer, a recently used state of an accessed cache line to be at or near least recently used, and based on the access intent being a second value, not adjusting, by the computer, the recently used state of the accessed cache line to be most recently used.

According to one embodiment, based on the access intent, adjusting one or more cache behaviors for the operand of the next sequential instruction further comprises based on a cache miss and the access intent, requesting, by the computer, a cache line to be read only or exclusive from a next higher level cache.

According to one embodiment, the computer comprises a processor and a co-processor.

DETAILED DESCRIPTION

In accordance with an embodiment, a method, system, and computer program product is provided for performing cache management in mainframes, in particular, cache line (cache-line) management. Specific details concerning the principles of operations of a mainframe, for example an IBM mainframe, including instructions directed towards the mainframe can be found in the "IBM z/Architecture Principles of Operation" published August 2010, reference number SA22-7832-08, incorporated herein by reference. The term CPU and processor may be used interchangeable throughout the specification.

Figure 1A:
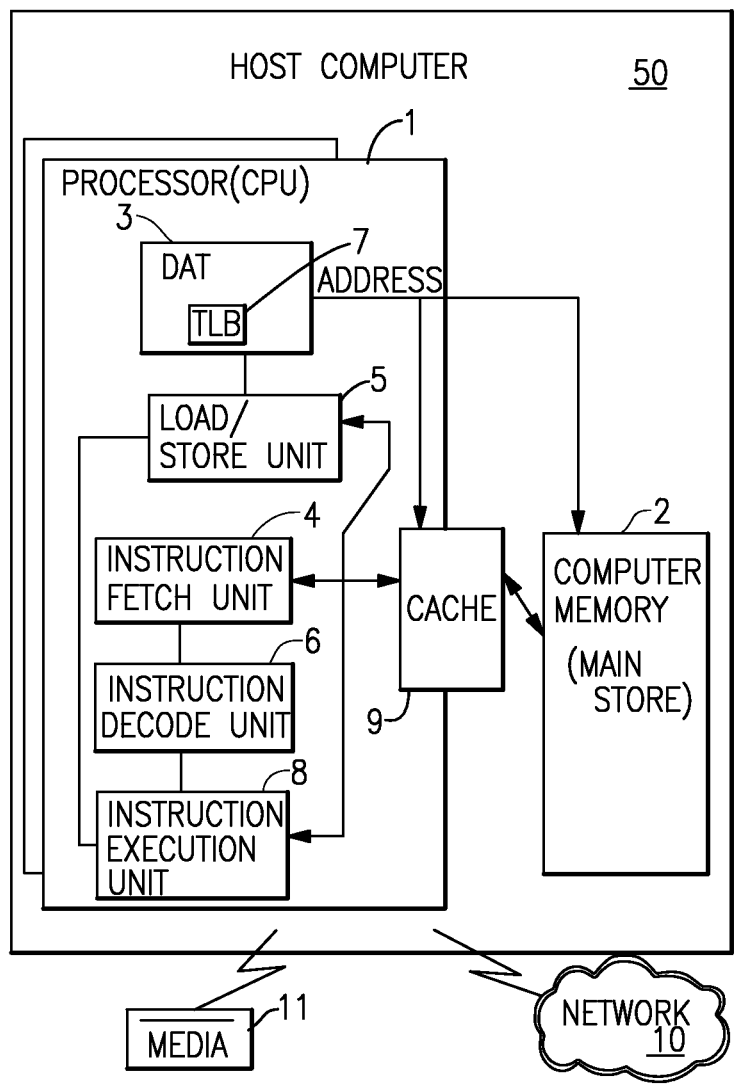
FIG. 1A illustrates one embodiment of a Host computer system.

Referring to FIG. 1A, representative components of a Host Computer system 50 are portrayed. Other arrangements of components may also be employed in a computer system, which are well known in the art. The representative Host Computer 50 comprises one or more CPUs 1 in communication with main store (Computer Memory 2) as well as I/O interfaces to storage devices 11 and networks 10 for communicating with other computers or SANs and the like. The CPU 1 is compliant with an architecture having an architected instruction set and architected functionality. The CPU 1 may have Dynamic Address Translation (DAT) 3 for transforming program addresses (virtual addresses) into real address of memory. A DAT typically includes a Translation Lookaside Buffer (TLB) 7 for caching translations so that later accesses to the block of computer memory 2 do not require the delay of address translation. Typically a cache 9 is employed between Computer Memory 2 and the Processor 1. The cache 9 may be hierarchical having a large cache available to more than one CPU and smaller, faster (lower level) caches between the large cache and each CPU. In some implementations the lower level caches are split to provide separate low level caches for instruction fetching and data accesses. In an embodiment, an instruction is fetched from memory 2 by an instruction fetch unit 4 via a cache 9. The instruction is decoded in an instruction decode unit (6) and dispatched (with other instructions in some embodiments) to instruction execution units 8. Typically several execution units 8 are employed, for example an arithmetic execution unit, a floating point execution unit and a branch instruction execution unit. The instruction is executed by the execution unit, accessing operands from instruction specified registers or memory as needed. If an operand is to be accessed (loaded or stored) from memory 2, a load store unit 5 typically handles the access under control of the instruction being executed. Instructions may be executed in hardware circuits or in internal microcode (firmware) or by a combination of both.

Figure 1B:
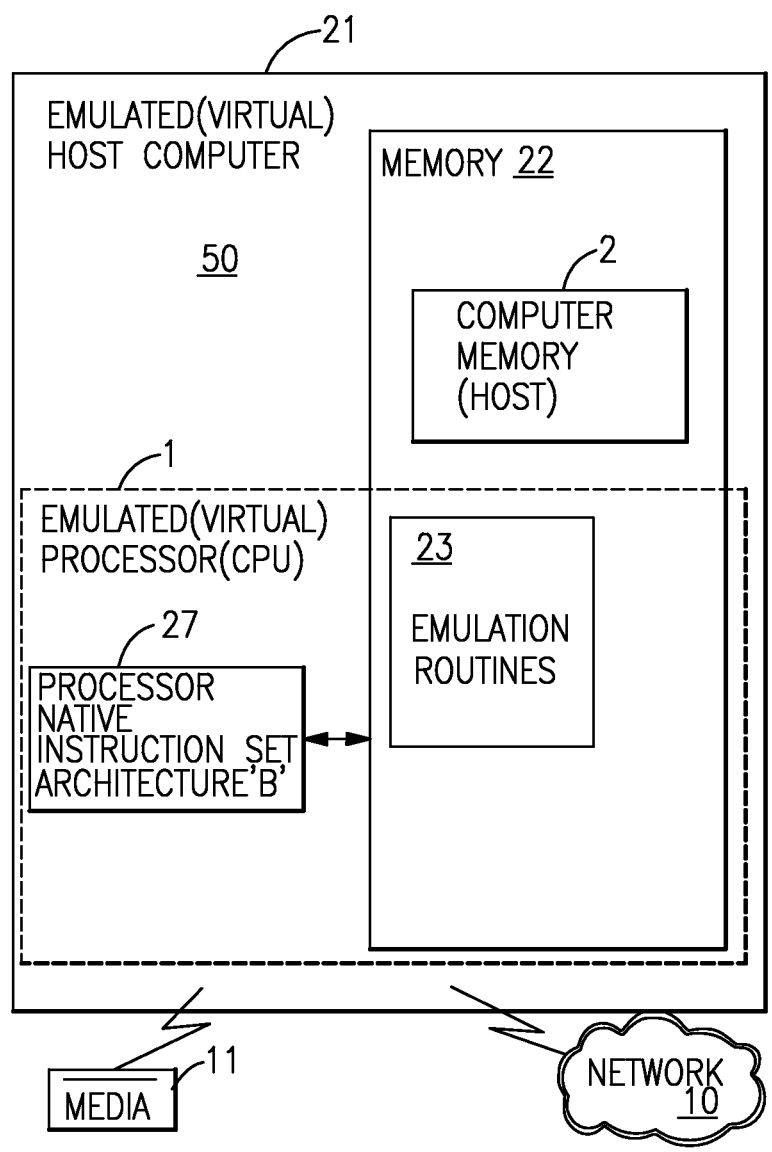
FIG. 1B illustrates one embodiment of an emulation Host computer system.

In FIG. 1B, an embodiment of an emulated Host Computer system 21 is provided that emulates a Host computer system 50 of a Host architecture. In the emulated Host Computer system 21, the Host processor (CPU) 1 is an emulated Host processor (or virtual Host processor) and comprises an emulation processor 27 having a different native instruction set architecture than that of the processor 1 of the Host Computer 50. The emulated Host Computer system 21 has memory 22 accessible to the emulation processor 27. In the example embodiment, the Memory 22 is partitioned into a Host Computer Memory 2 portion and an Emulation Routines 23 portion. The Host Computer Memory 2 is available to programs of the emulated Host Computer 21 according to Host Computer Architecture. The emulation Processor 27 executes native instructions of an architected instruction set of an architecture other than that of the emulated processor 1, the native instructions obtained from Emulation Routines memory 23, and may access a Host instruction for execution from a program in Host Computer Memory 2 by employing one or more instruction(s) obtained in a Sequence & Access/Decode routine which may decode the Host instruction(s) accessed to determine a native instruction execution routine for emulating the function of the Host instruction accessed. Other facilities that are defined for the Host Computer System 50 architecture may be emulated by Architected Facilities Routines, including such facilities as General Purpose Registers, Control Registers, Dynamic Address Translation and I/O Subsystem support and processor cache for example. The Emulation Routines may also take advantage of function available in the emulation Processor 27 (such as general registers and dynamic translation of virtual addresses) to improve performance of the Emulation Routines. Special Hardware and Off-Load Engines may also be provided to assist the processor 27 in emulating the function of the Host Computer 50.

In a mainframe, architected machine instructions are used by programmers, for example by "C" programmers through a compiler application. These instructions stored in the storage medium may be executed natively in a mainframe server, or alternatively in machines executing other architectures. They can be emulated in the existing and in future mainframe servers and on other machines. They may be executed in machines running on operating systems, such as open source, on a wide variety of machines using hardware manufactured by various companies in an emulation mode. In emulation mode, emulation software is executed by a native processor to emulate the architecture of an emulated processor.

The native processor 27 typically executes emulation software 23 comprising either firmware or a native operating system to perform emulation of the emulated processor. The emulation software 23 is responsible for fetching and executing instructions of the emulated processor architecture. The emulation software 23 maintains an emulated program counter to keep track of instruction boundaries. The emulation software 23 may fetch one or more emulated machine instructions at a time and convert the one or more emulated machine instructions to a corresponding group of native machine instructions for execution by the native processor 27. These converted instructions may be cached such that a faster conversion can be accomplished. Not withstanding, the emulation software must maintain the architecture rules of the emulated processor architecture so as to assure operating systems and applications written for the emulated processor operate correctly. Furthermore the emulation software must provide resources identified by the emulated processor 1 architecture including, but not limited to control registers, general purpose registers, floating point registers, dynamic address translation function including segment tables and page tables for example, interrupt mechanisms, context switch mechanisms, Time of Day (TOD) clocks and architected interfaces to I/O subsystems such that an operating system or an application program designed to run on the emulated processor, can be run on the native processor having the emulation software.

A specific instruction being emulated is decoded, and a subroutine is called to perform the function of the individual instruction. An emulation software function 23 emulating a function of an emulated processor 1 is implemented, for example, in a "C" subroutine or driver, or some other method of providing a driver for the specific hardware as will be within the skill of those in the art after understanding the description of the preferred embodiment. Various software and hardware emulation patents including, but not limited to (1) U.S. Pat. No. 5,551,013 for a "Multiprocessor for hardware emulation" by Beausoleil et al.; (2) U.S. Pat. No. 6,009,261: "Preprocessing of stored target routines for emulating incompatible instructions on a target processor" by Scalzi et al; (3) U.S. Pat. No. 5,574,873: "Decoding guest instruction to directly access emulation routines that emulate the guest instructions" by Davidian et al; (4) U.S. Pat. No. 6,308,255: "Symmetrical multiprocessing bus and chipset used for coprocessor support allowing non-native code to run in a system" by Gorishek et al; (5) U.S. Pat. No. 6,463,582: "Dynamic optimizing object code translator for architecture emulation and dynamic optimizing object code translation method" by Lethin et al; (6) U.S. Pat. No. 5,790,825: "Method for emulating guest instructions on a host computer through dynamic recompilation of host instructions" by Eric Traut; and many others, illustrate the a variety of known ways to achieve emulation of an instruction format architected for a different machine for a target machine available to those skilled in the art, as well as those commercial software techniques used by those referenced above.

Figure 1C:
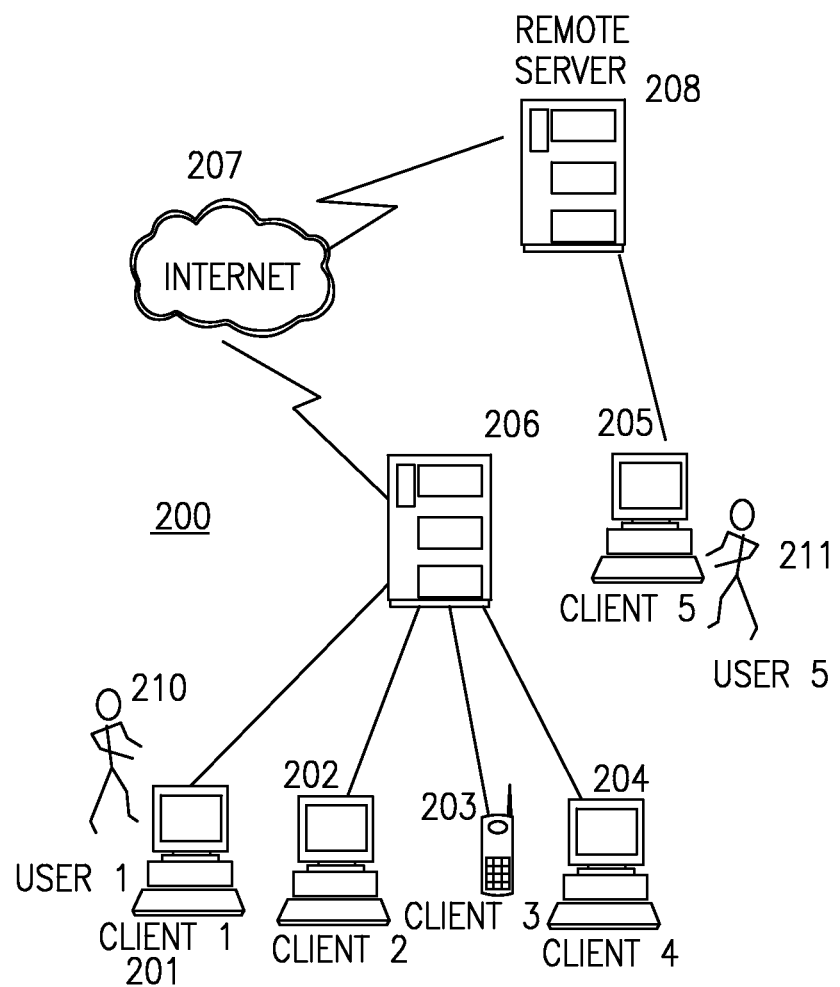
FIG. 1C illustrates one embodiment of a computer network.

FIG. 1C illustrates a data processing network 100 in which an embodiment may be practiced. The data processing network 100 may include a plurality of individual networks, such as a wireless network and a wired network, each of which may include a plurality of individual workstations 101, 102, 103, 104, 105. Additionally, as those skilled in the art will appreciate, one or more LANs may be included, where a LAN may comprise a plurality of intelligent workstations coupled to a host processor.

Still referring to FIG. 1, the networks may also include mainframe computers or servers, such as a gateway computer (client server 106) or application server (remote server 108 which may access a data repository and may also be accessed directly from a workstation 105). A gateway computer 106 serves as a point of entry into each network 107. A gateway is needed when connecting one networking protocol to another. The gateway 106 may be preferably coupled to another network (the Internet 107 for example) by means of a communications link. The gateway 106 may also be directly coupled to one or more workstations 101, 102, 103, 104 using a communications link.

U.S. Pat. No. 6,578,111, "Cache memory system and method for managing streaming-data", Jun. 10, 2003, incorporated by reference, describes a cache memory system as follows: A system and method are provided for efficient handling of streaming-data in a cache memory system having a cache with several cache-lines capable of storing data. In one aspect, a method is provided for determining before storing data to a cache-line if the storing of data will replace earlier data already stored in cache. If the storing of data will replace data in the cache, it is determined if the data that will be replaced is streaming-data. If the data to be replaced is not streaming-data, it is stored into victim cache. However, if the data to be replaced is streaming-data, it is not stored into the victim cache, thereby improving system efficiency by eliminating the copying of data to be replaced and avoiding replacing other earlier data in victim cache that may be needed in the future.

Modem computer systems generally include a central processing unit (CPU) or processor for processing data and a memory system for storing operating instructions and data. Typically, the speed at which the processor is able to decode and execute instructions to process data exceeds the speed at which instructions and data is transferred between the memory system and the processor. Thus, the processor is often forced to wait for the memory system to respond. One way of reducing this memory latency period is to organize computer memory into a memory hierarchy. A memory hierarchy consists of multiple levels of memory each using different devices for storing data and each having different speeds, capacities and cost associated therewith. Generally, the lowest-level of memory, commonly known as a cache, is coupled closely to the processor and uses relatively expensive, faster devices that make information, either data or instructions, available to the processor in a shorter period of time. The higher-levels typically include a main-memory and mass-data-storage devices that albeit larger are slower and are therefore correspondingly cheaper.

Use of a cache reduces the memory latency period by temporarily storing a small subset of data from higher-levels of the memory system. When the processor needs information for an application, it first checks the high-speed cache. If the information is found in the cache (known as a cache-hit), the information will be retrieved from the cache and execution of the application will resume. If the information is not found in the cache (known as a cache-miss) then the processor will proceed to access the slower, higher-level memories. Information accessed in the higher-level memories is simultaneously stored or written in the lower-level cache so that should the information be required again in the future it is obtained directly from the lower-level cache, thereby reducing or eliminating any memory latency period.

Similarly, use of a cache can reduce the memory latency period during a write operation by writing to the cache. This reduces the memory latency period in two ways. First, by enabling the processor to write at the much greater speed of the cache, and second by storing or loading the information in the cache so that, again, should the processor need the information in the future it is obtained directly from the cache.

There are three primary types of technology used in memories today. The main-memory is typically implemented using slower, cheaper dynamic random access memory (DRAM) devices. The cache is implemented using faster random access memory devices, such as static random access memory devices (SRAMs) so that accessing a cache takes much less time to complete than to access main-memory. SRAMs typically require greater number of devices per bit of information stored, and thus are more expensive than DRAM. In order to further reduce the memory latency period the cache may be located on the same chip as the CPU. The proximity of the cache to the CPU increases the speed with which the CPU can access the cache by eliminating delays due to transmission over external circuits. A cache located on the same chip as the CPU is often known as primary or level 1 (L1 cache) cache since the memory system typically includes a larger, slower level 2 (L2 cache) cache outside the CPU chip. Some memory systems include additional caches, for example a level (L3 cache) or victim cache for temporarily storing data displaced from the L2 cache.

As the name implies, at the highest-level in memory, mass-storage-devices provide the largest data storage capacity and typically use the slowest and therefore cheapest technology. For example, magnetic, optical or magnetic-optical technologies to store large amounts of instructions and data on tapes, or fixed or removable disks.

Figure 2A:
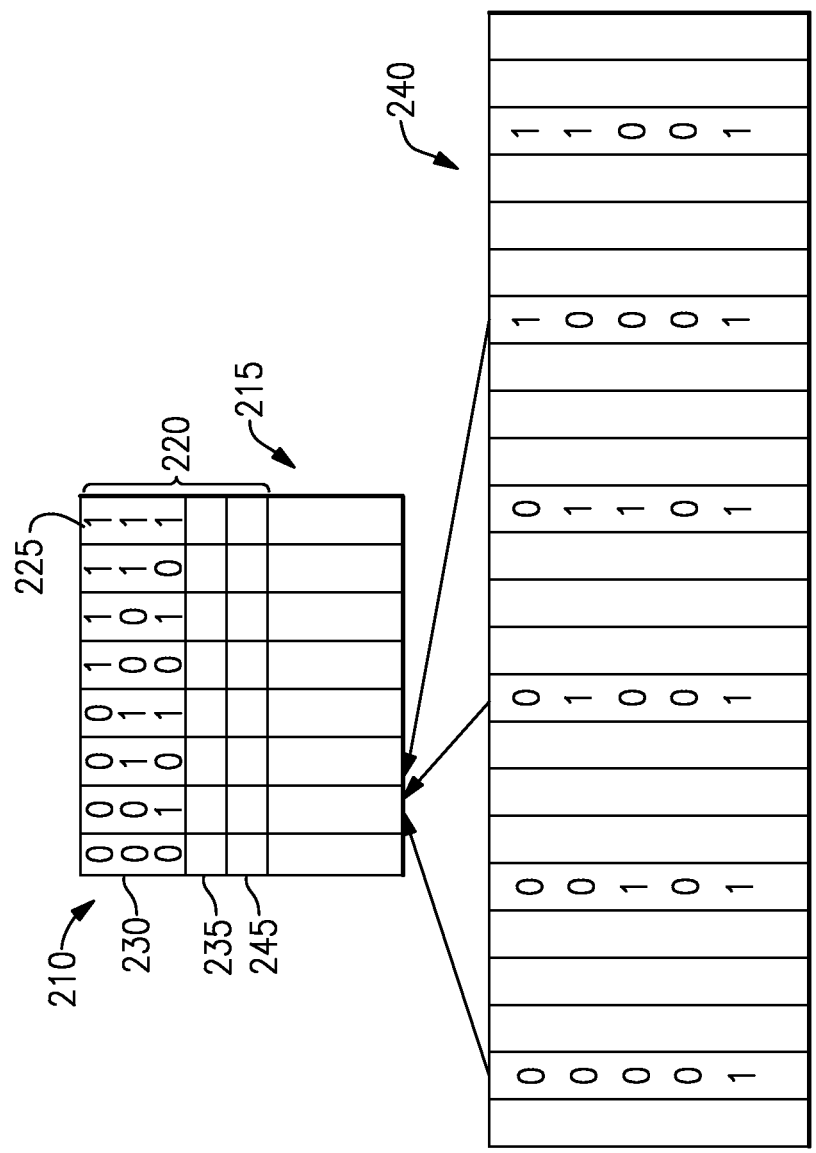
FIG. 2A illustrates a cache.

Referring to FIG. 2A, cache 210 is divided logically into two main components or functional units. Data-store 215, where the cached information is actually stored, and tag-field 220, a small area of memory used by the cache to keep track of the location in the memory where the associated data can be found. The data-store is structured or organized as a number of cache-lines 225 or sets of cache-lines each having a tag-field 220 associated therewith, and each capable of storing multiple blocks or bytes of data. Typically, in modern computers each cache-line 225 may store 32 or 64 bytes of data. Each cache line is associated with a tag-field 220. In an n-way cache, there are n tags for each set. The tag-field 220 for each cache-line 225 includes an index 230 that uniquely identifies each cache-line or sets of cache-lines in the cache 210, and tag 235 that is used in combination with the index to identify an address in higher-level memory 240 from which data-stored in the cache-line has been read from or written to. Often the index 230 is not stored in the cache 210 but is implicit, with the address of the cache-line 225 itself providing the index. Typically, the tag-field 220 for each cache-line 225 also includes one or more bits, commonly known as a validity-bit 245, to indicate whether the cache-line contains valid data. In addition, the tag-field 220 may contain other bits (not shown) for example for indicating whether data at the location is dirty, that is has been modified but not written back to higher-level memory 240.

To speed up memory access operations, caches rely on principles of temporal and spatial-locality. These principles of locality are based on the assumption that, in general, a computer program accesses only a relatively small portion of the information available in computer memory in a given period of time. In particular, temporal locality holds that if some information is accessed once, it is likely to be accessed again soon, and spatial locality holds that if one memory location is accessed then other nearby memory locations are also likely to be accessed. Thus, in order to exploit temporal-locality, caches temporarily store information from a higher-level memory the first time it is accessed so that if it is accessed again soon it need not be retrieved from the higher-level memory. To exploit spatial-locality, caches transfer several blocks of data from contiguous addresses in higher-level memory, besides the requested block of data, each time data is written in the cache from higher-level memory.

The most important characteristics of a cache are its hit rate, that is the fraction of all memory accesses that are satisfied from the cache over a given period of time, and its access time, that is the time it takes to read from or write to the cache. These in turn depend in large part on how the cache is mapped to addresses in the higher-level memory. The choice of mapping technique is so critical to the design of the cache that the cache is often named after this choice. There are generally three different ways to map the cache to the addresses in memory.

Direct-mapping, shown in FIG. 2A, is the simplest way to map a cache to addresses in main-memory. In the direct-mapping method the number of cache-lines is determined, the addresses in memory divided into the same number of groups of addresses, and addresses in each group associated with one cache-line. For example, for a cache having $2^n$ cache-lines, the addresses are divided into $2^n$ groups and each address in a group associated with a single cache-line. The lowest n address bits of an address corresponds to the index of the cache-line to which data from the address is stored. The remaining top address bits are stored as a tag that identifies from which of the several possible addresses in the group the data originated. For example, to map a 64 mega-byte (MB) main-memory to a 512 kilobyte (KB) direct mapped cache having 16,384 cache-lines, each cache-line is shared by a group of 4,096 addresses in main-memory. To address 64-MB of memory requires 26 address bits since 64-MB is $2^{26}$ bytes. The lowest five of these address bits, A0 to A4, are ignored in the mapping process, although the processor will use them later to determine which of the 32 bytes of data in the cache-line to accesses. The next 14 address bits, A5 to A18, provide the index of the cache-line to which the address is mapped. Because any cache-line can hold data from any one of 4,096 possible addresses in main-memory, the next seven highest address bits, A19 to A25, are used as a tag to identify to the processor which of the addresses the cache-line holds data from. This scheme, while simple, has the disadvantage that if the program alternately accesses different addresses which map to the same cache location, i.e., addresses within the same group, then it will suffer a cache-miss on every access to these locations.

A fully-associative mapped cache (not shown) avoids the cache conflict of the directly mapped cache by allowing blocks of data from any address in main-memory to be stored anywhere in the cache. However, one problem with fully associative caches is that the whole main-memory address must be used as a tag, thereby increasing the size of the tag-field and reducing cache capacity for storing data. Also, because the requested address must be compared simultaneously (associatively) with all tags in the cache, the access time for the cache is increased.

Figure 2B:
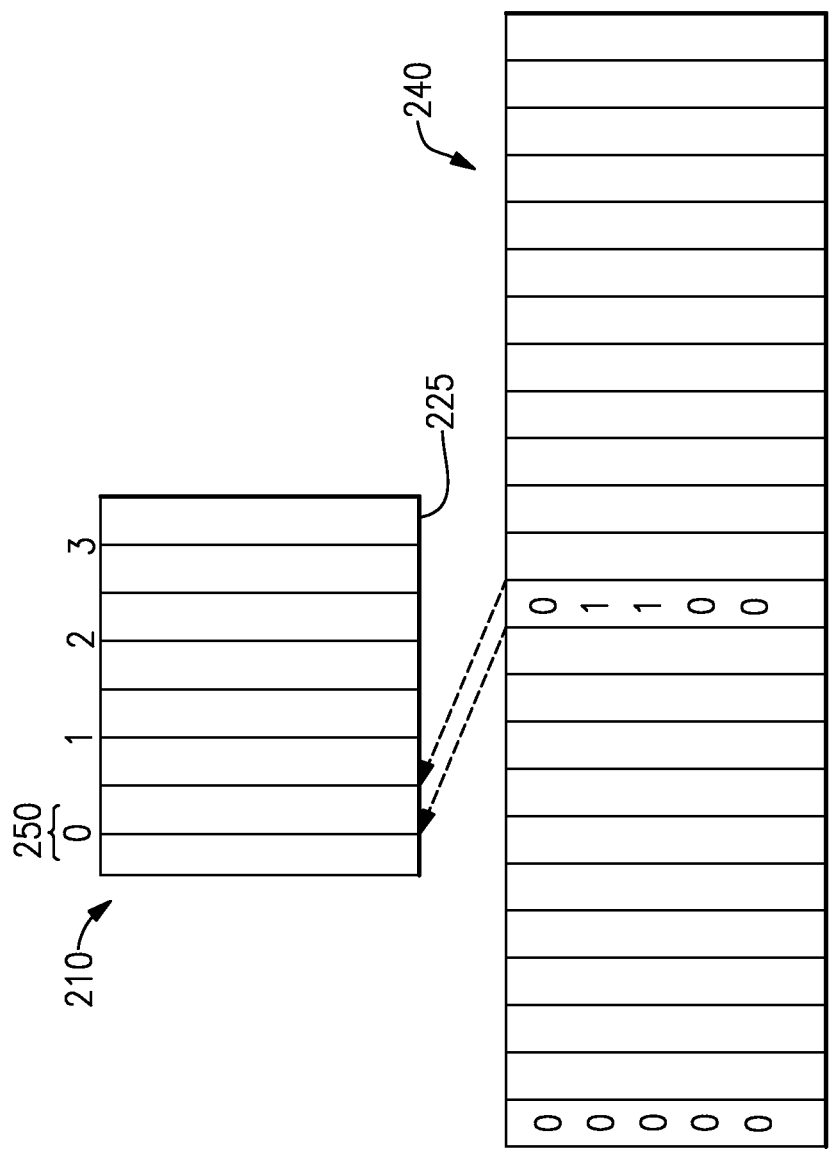
FIG. 2B illustrates a 2-way set associative cache.

A 2-way set associative cache, shown in FIG. 2B, is a compromise between the direct mapped and fully associative designs. In this design, the cache 210 is broken into sets 250 each having a number or ID, 2, 4, 8 etc., of cache-lines 225 and each address in main-memory 240 is assigned to a set and is able to be stored in any one of the cache-lines within the set. Typically, such a cache is referred to as a n-way set associative cache where n is the number of cache-lines in each set. FIG. 2B shows an example of a 2-way set associative cache.

Memory addresses are mapped in the cache in a manner similar to the directly mapped cache. For example, to map a 64-MB main-memory having 26 address bits to a 512-KB 4-way set associative cache the cache is divided into 4,096 sets of 4 cache-lines each and 16,384 addresses in main-memory associated with each set. Address bits A5 to A16 of a memory address represent the index of the set to which the address maps to. The memory address could be mapped to any of the four cache-lines in the set. Because any cache-line within a set can hold data from any one of 16,384 possible memory addresses, the next nine highest address bits, A17 to A25, are used as a tag to identify to the processor which of the memory addresses the cache-line holds data from. Again, the lowest five address bits, A0 to A4, are ignored in the mapping process, although the processor will use them later to determine which of the 32 bytes of data in the cache-line to accesses.

When a fully associative or a set associative cache is full and it is desired to store another cache-line of data in the cache then a cache-line is selected to be written-back or flushed to main-memory or to a higher-level victim cache. The new data is then stored in place of the flushed cache-line. The cache-line to be flushed is chosen based on a replacement policy implemented via a replacement algorithm.

There are various different replacement algorithms that can be used. One utilized replacement algorithm is known as the Least Recently Used (LRU) replacement algorithm. According to the LRU replacement algorithm, for each cache-line, the cache controller maintains in a register several status bits that keep track of the number of times in which the cache-line was last accessed, a cache line state. Each time one of the cache-lines is accessed, it is marked most recently used (MRU) and the other cache-lines in the same set of cache-lines are adjusted accordingly. A cache-line is elected to be flushed if it has been accessed (read or written to) less recently than any other cache-line on the set of cache-lines, i.e. the LRU cache line. The LRU replacement policy is based on the assumption that, in general, the cache-line which has not been accessed for longest time is least likely to be accessed in the near future. For example, in an 8 way set associative cache, for each row of the cache the LRU logic tracks the order of recent usage of each of the 8 set ids.

Other replacement schemes that are used include random replacement, an algorithm that picks any cache-line with equal probability; First-In-First-Out (FIFO), an algorithm that simply replaces the first cache-line loaded in a particular set or group of cache lines; and Lease-Frequently-Used (LFU) algorithm that replace the least used cache line by counting (with an upper threshold) how often a cache line had been used.

Figure 3:
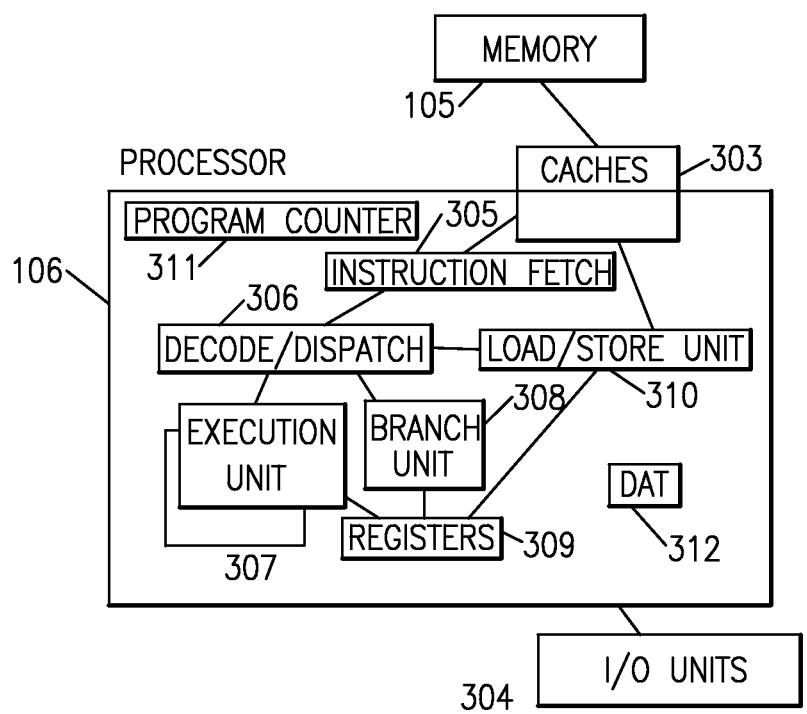
FIG. 3 illustrates one embodiment of elements of a computer system.

Referring to FIG. 3, an exemplary processor embodiment is depicted for processor 106. Typically one or more levels of Cache 303 are employed to buffer memory blocks in order to improve processor performance. The cache 303 is a high speed buffer holding cache lines of memory data that are likely to be used. Typical cache lines are 32, 64, 128 or 256 bytes of memory data. Separate Caches are often employed for caching instructions than for caching data. Cache coherence (synchronization of copies of lines in Memory and the Caches) among multiple processors is often provided by various "Snoop" algorithms well known in the art.

A program counter (instruction counter) 311 keeps track of the address of the current instruction to be executed. A program counter in a z/Architecture processor is 64 bits and can be truncated to 31 or 24 bits to support prior addressing limits. A program counter is typically embodied in a PSW (program status word) of a computer such that it persists during context switching. Thus, a program in progress, having a program counter value, may be interrupted by, for example, the operating system (context switch from the program environment to the Operating system environment). The PSW of the program maintains the program counter value while the program is not active, and the program counter (in the PSW) of the operating system is used while the operating system is executing. Typically the Program counter is incremented by an amount equal to the number of bytes of the current instruction. RISC (Reduced Instruction Set Computing) instructions are typically fixed length while CISC (Complex Instruction Set Computing) instructions are typically variable length. Instructions of the IBM z/Architecture are CISC instructions having a length of 2, 4 or 6 bytes. The Program counter 311 is modified by either a context switch operation or a Branch taken operation of a Branch instruction for example. In a context switch operation, the current program counter value is saved in a Program Status Word (PSW) along with other state information about the program being executed (such as condition codes), and a new program counter value is loaded pointing to an instruction of a new program module to be executed. A branch taken operation is performed in order to permit the program to make decisions or loop within the program by loading the result of the Branch Instruction into the Program Counter 311.

Typically an instruction Fetch Unit 305 is employed to fetch instructions on behalf of the processor 106. The fetch unit either fetches "next sequential instructions", target instructions of Branch Taken instructions, or first instructions of a program following a context switch. Modern Instruction fetch units often employ prefetch techniques to speculatively prefetch instructions based on the likelihood that the prefetched instructions might be used. For example, a fetch unit may fetch 16 bytes of instruction that includes the next sequential instruction and additional bytes of further sequential instructions.

The fetched instructions are then executed by the processor 106. In an embodiment, the fetched instruction(s) are passed to a dispatch unit 306 of the fetch unit. The dispatch unit decodes the instruction(s) and forwards information about the decoded instruction(s) to appropriate units 307 308 310. An execution unit 307 will typically receive information about decoded arithmetic instructions from the instruction fetch unit 305 and will perform arithmetic operations on operands according to the opcode of the instruction. Operands are provided to the execution unit 307 preferably either from memory 105, architected registers 309 or from an immediate field of the instruction being executed. Results of the execution, when stored, are stored either in memory 105, registers 309 or in other machine hardware (such as control registers, PSW registers and the like).

Figure 4A:
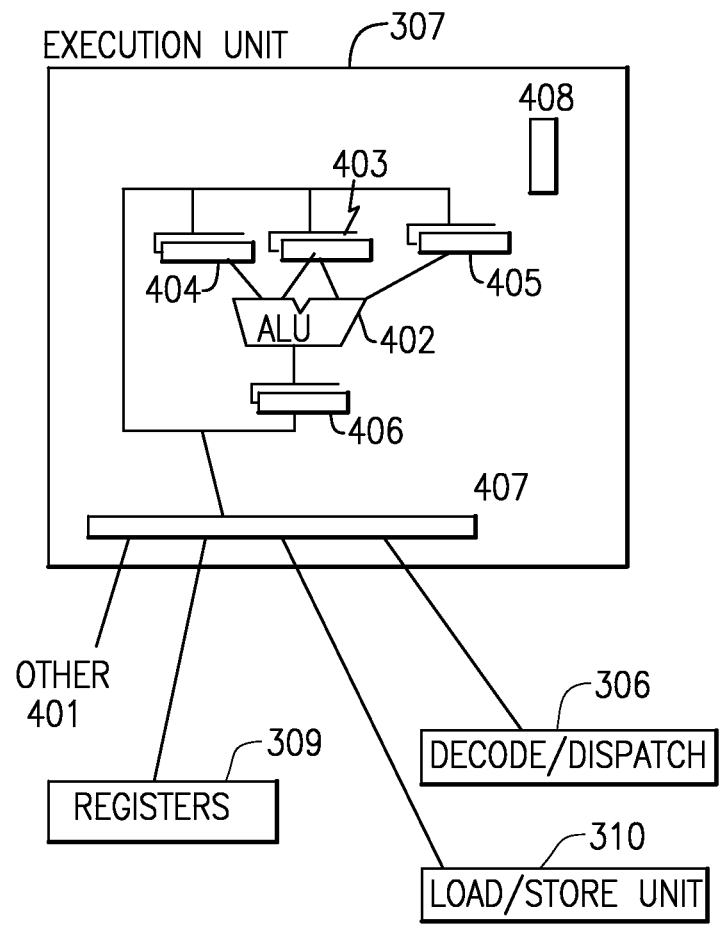
FIG. 4A-4C illustrate embodiments of detailed elements of a computer system.

A processor 106 typically has one or more execution units 307 308 310 for executing the function of the instruction. Referring to FIG. 4A, an execution unit 307 may communicate with architected general registers 309, a decode/dispatch unit 306 a load store unit 310 and other 401 processor units by way of interfacing logic 407. An Execution unit 307 may employ several register circuits 403 404 405 to hold information that the arithmetic logic unit (ALU) 402 will operate on. The ALU performs arithmetic operations such as add, subtract, multiply and divide as well as logical function such as and, or and exclusive-or (xor), rotate and shift. Preferably the ALU supports specialized operations that are design dependent. Other circuits may provide other architected facilities 408 including condition codes and recovery support logic for example. Typically the result of an ALU operation is held in an output register circuit 406 which can forward the result to a variety of other processing functions. There are many arrangements of processor units, the present description is only intended to provide a representative understanding of one embodiment.

An ADD instruction for example would be executed in an execution unit 307 having arithmetic and logical functionality while a Floating Point instruction for example would be executed in a Floating Point Execution having specialized Floating Point capability. Preferably, an execution unit operates on operands identified by an instruction by performing an opcode defined function on the operands. For example, an ADD instruction may be executed by an execution unit 307 on operands found in two registers 309 identified by register fields of the instruction. The execution unit 307 performs the arithmetic addition on two operands and stores the result in a third operand where the third operand may be a third register or one of the two source registers.

Some ALUs 402 are designed for scalar operations and some for floating point. Data may be Big Endian (where the least significant byte is at the highest byte address) or Little Endian (where the least significant byte is at the lowest byte address) depending on architecture. The IBM z/Architecture is Big Endian. Signed fields may be sign and magnitude, 1's complement or 2's complement depending on architecture. A 2's complement number is advantageous in that the ALU does not need to design a subtract capability since either a negative value or a positive value in 2's complement requires only and addition within the ALU. Numbers are commonly described in shorthand, where a 12 bit field defines an address of a 4,096 byte block and is commonly described as a 4 Kbyte (Kilo-byte) block for example.

Figure 4B:
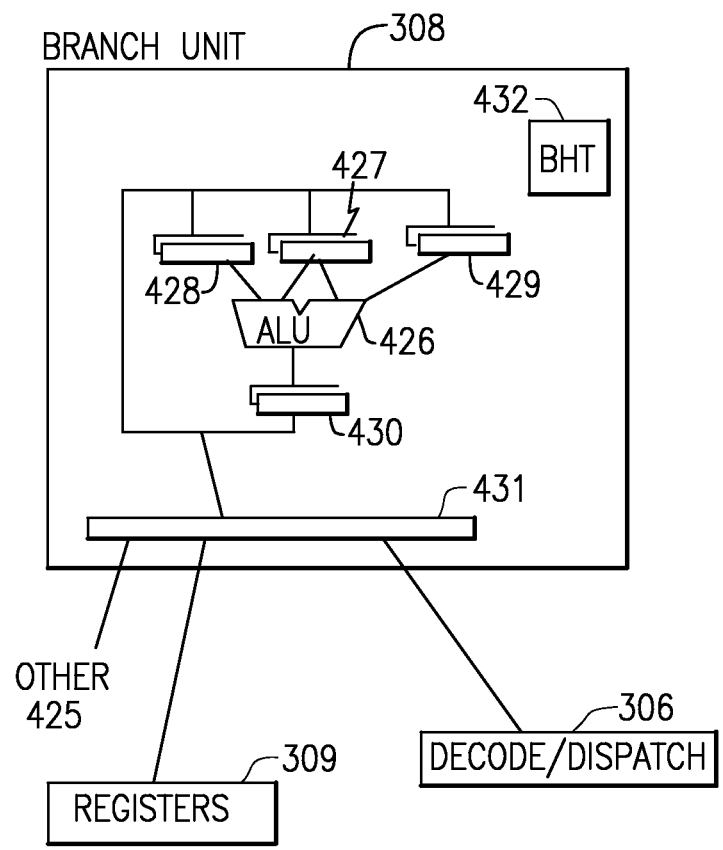

Referring to FIG. 4B, Branch instruction information for executing a branch instruction is typically sent to a branch unit 308 which often employs a branch prediction algorithm such as a branch history table 432 to predict the outcome of the branch before other conditional operations are complete. The target of the current branch instruction will be fetched and speculatively executed before the conditional operations are complete. When the conditional operations are completed the speculatively executed branch instructions are either completed or discarded based on the conditions of the conditional operation and the speculated outcome. A typical branch instruction may test condition codes and branch to a target address if the condition codes meet the branch requirement of the branch instruction, a target address may be calculated based on several numbers including ones found in register fields or an immediate field of the instruction for example. The branch unit 308 may employ an ALU 426 having a plurality of input register circuits 427 428 429 and an output register circuit 430. The branch unit 308 may communicate with general registers 309, decode dispatch unit 306 or other circuits 425 for example.

The execution of a group of instructions can be interrupted for a variety of reasons including a context switch initiated by an operating system, a program exception or error causing a context switch, an I/O interruption signal causing a context switch or multi-threading activity of a plurality of programs (in a multi-threaded environment) for example. Preferably a context switch action saves state information about a currently executing program and then loads state information about another program being invoked. State information may be saved in hardware registers or in memory for example. State information preferably comprises a program counter value pointing to a next instruction to be executed, condition codes, memory translation information and architected register content. A context switch activity can be exercised by hardware circuits, application programs, operating system programs or firmware code (microcode, pico-code or licensed internal code (LIC) alone or in combination.

A processor accesses operands according to instruction defined methods. The instruction may provide an immediate operand using the value of a portion of the instruction, may provide one or more register fields explicitly pointing to either general purpose registers or special purpose registers (floating point registers for example). The instruction may utilize implied registers identified by an opcode field as operands. The instruction may utilize memory locations for operands. A memory location of an operand may be provided by a register, an immediate field, or a combination of registers and immediate field as exemplified by the z/Architecture long displacement facility wherein the instruction defines a Base register, an Index register and an immediate field (displacement field) that are added together to provide the address of the operand in memory for example. Location herein typically implies a location in main memory (main storage) unless otherwise indicated.

Figure 4C:
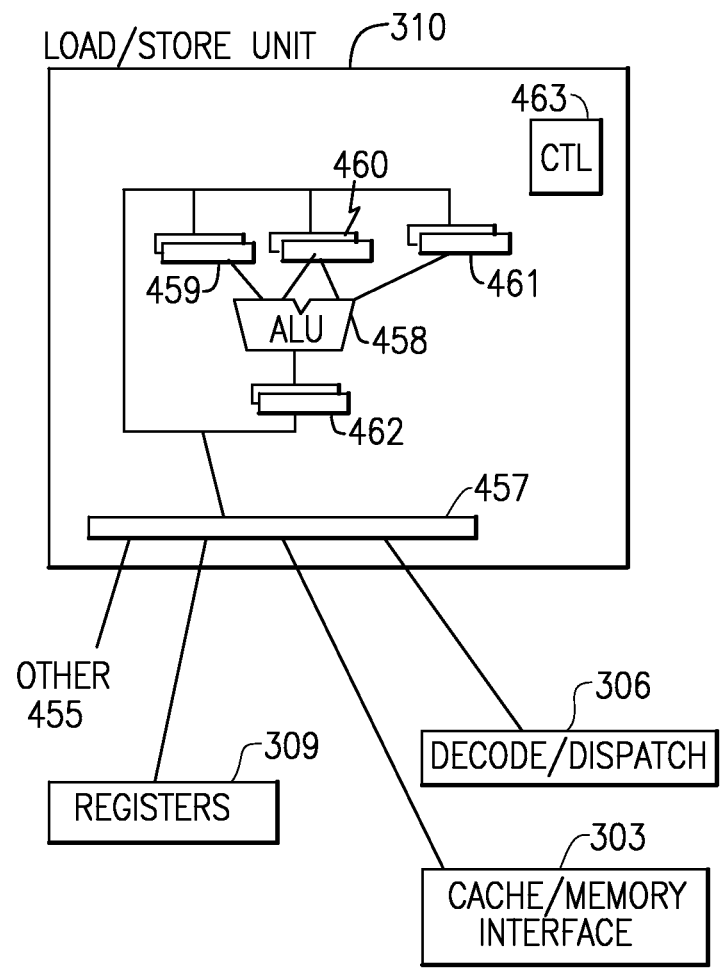
Figure 5A:
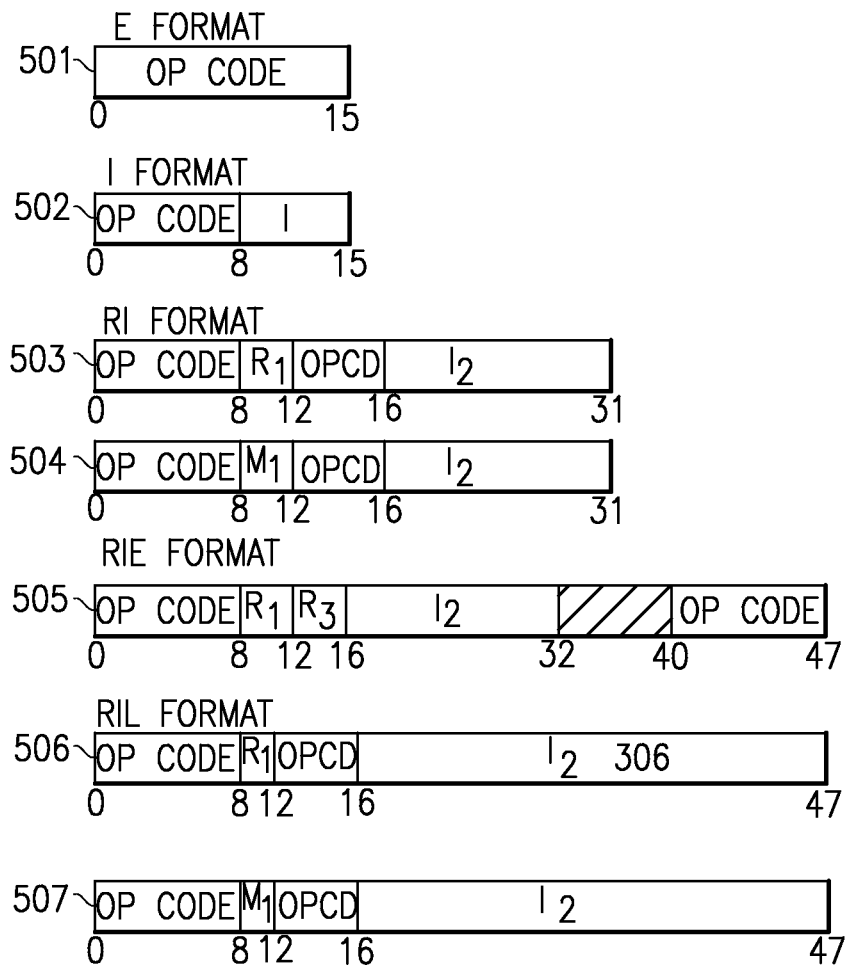
FIG. 5A-5F illustrate embodiments of machine instruction format of a computer system.
Figure 5B:
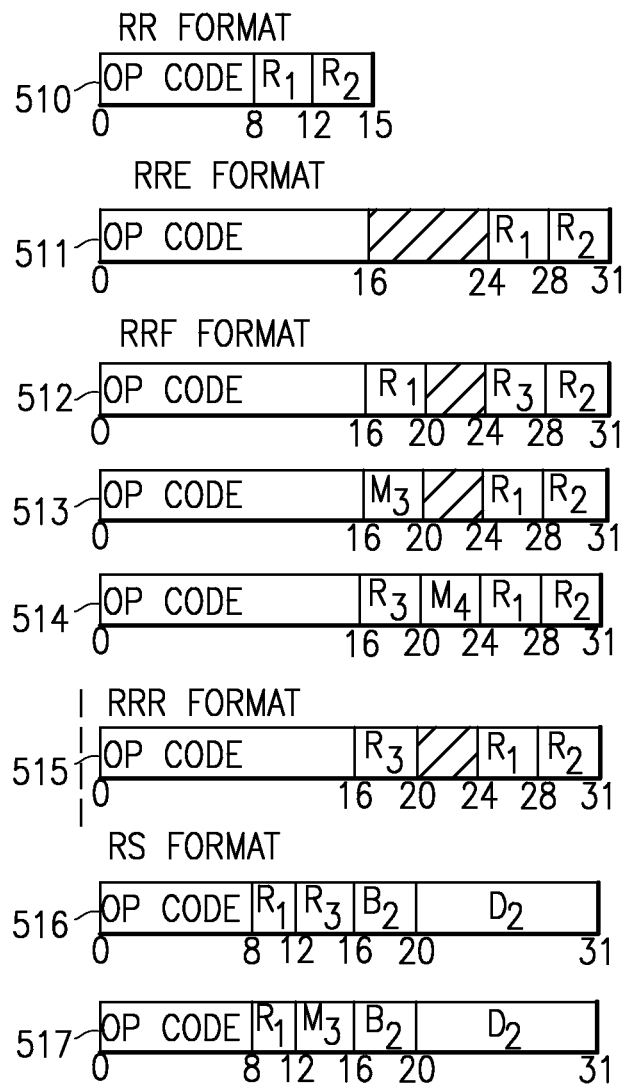
Figure 5C:
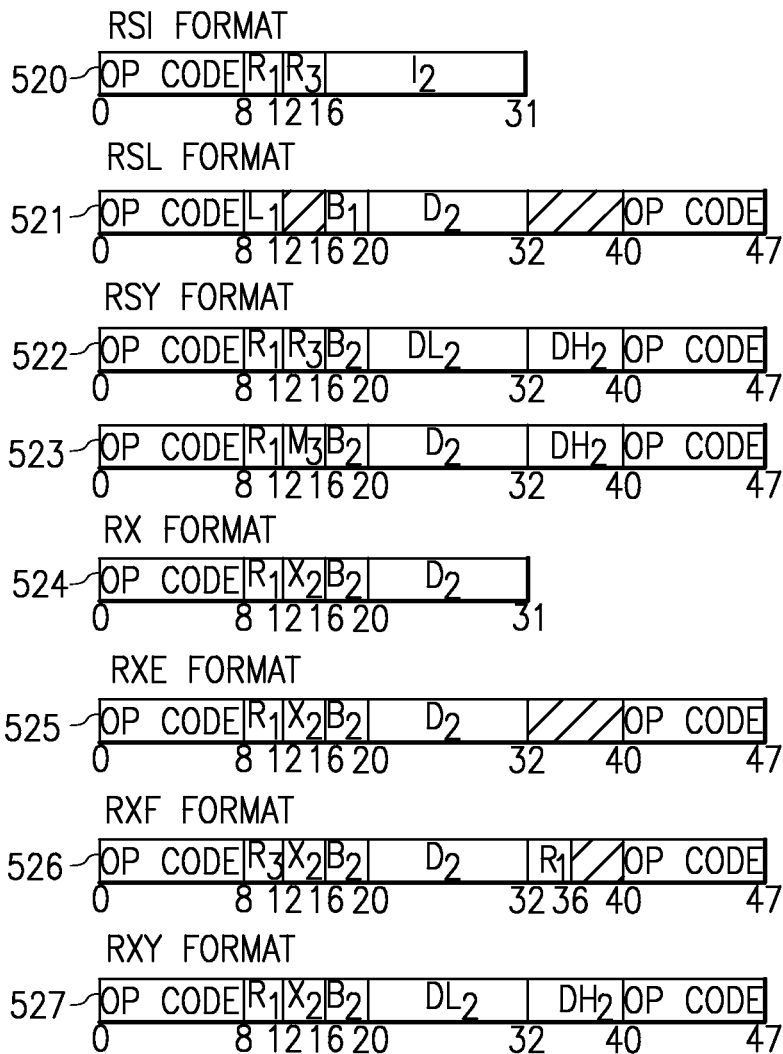
Figure 5D:
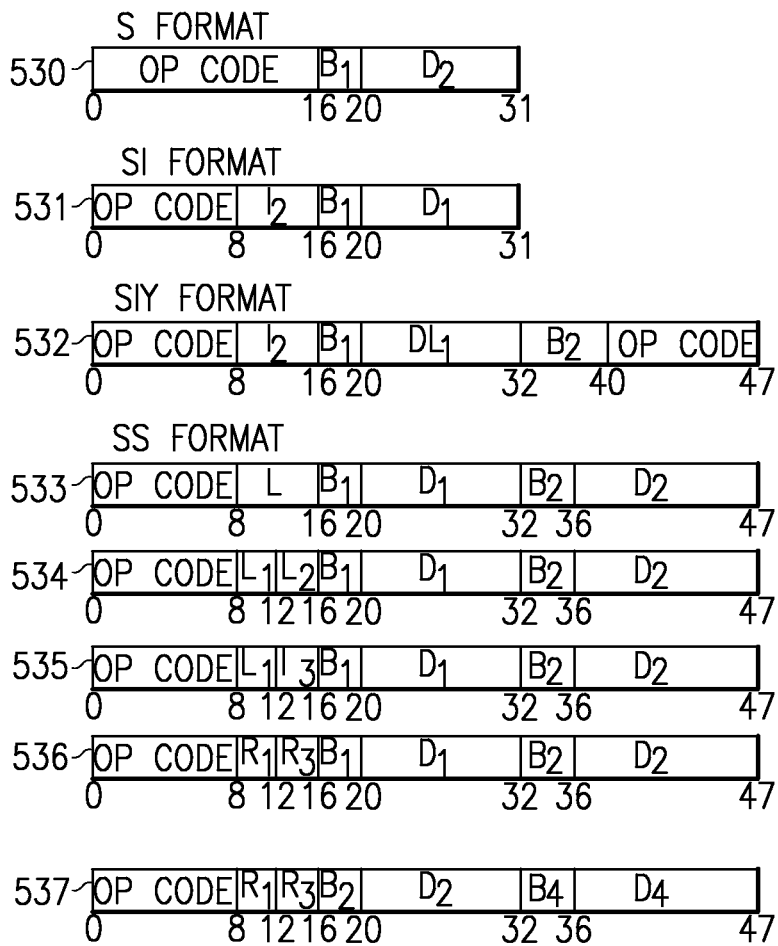
Figure 5E:
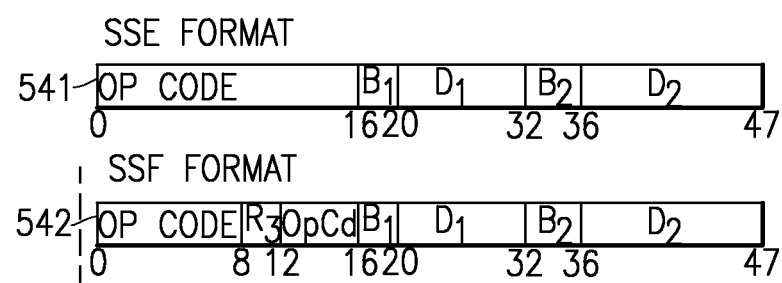
Figure 5F:
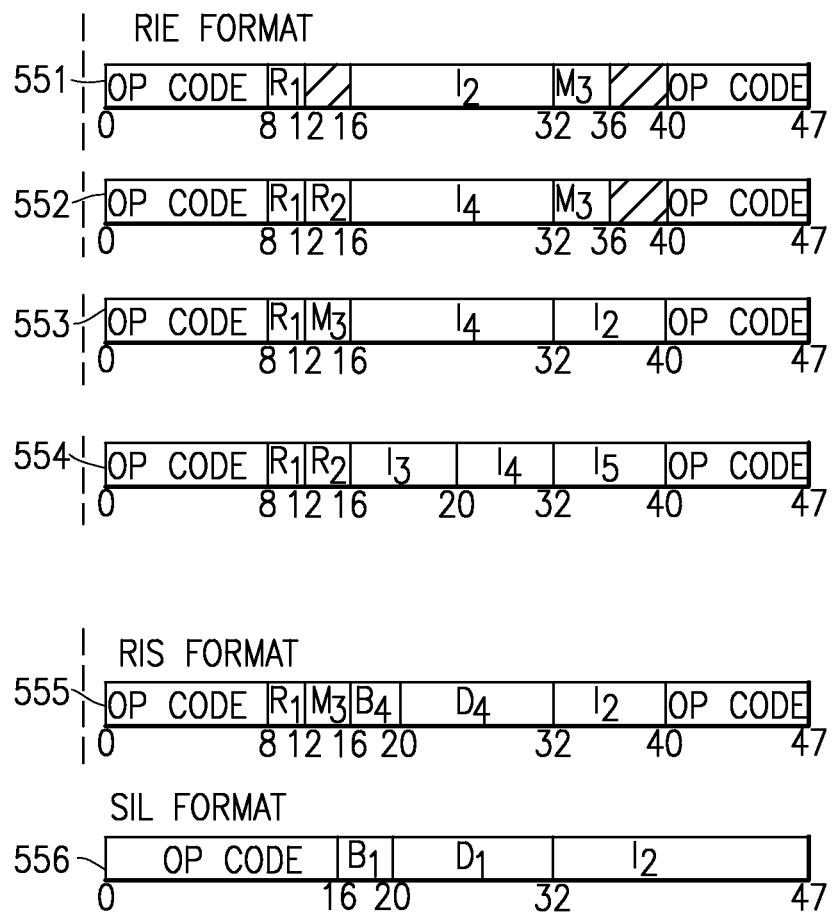

Referring to FIG. 4C, a processor accesses storage using a Load/Store unit 310. The Load/Store unit 310 may perform a Load operation by obtaining the address of the target operand in memory 303 and loading the operand in a register 309 or another memory 303 location, or may perform a Store operation by obtaining the address of the target operand in memory 303 and storing data obtained from a register 309 or another memory 303 location in the target operand location in memory 303. The Load/Store unit 310 may be speculative and may access memory in a sequence that is out-of-order relative to instruction sequence, however the Load/Store unit 310 must maintain the appearance to programs that instructions were executed in order. A load/store unit 310 may communicate with general registers 309, decode/dispatch unit 306, Cache/Memory interface 303 or other elements 455 and comprises various register circuits, ALUs 458 and control logic 463 to calculate storage addresses and to provide pipeline sequencing to keep operations in-order. Some operations may be out of order but the Load/Store unit provides functionality to make the out of order operations to appear to the program as having been performed in order as is well known in the art.

Preferably addresses that an application program "sees" are often referred to as virtual addresses. Virtual addresses are sometimes referred to as "logical addresses" and "effective addresses". These virtual addresses are virtual in that they are redirected to physical memory location by one of a variety of Dynamic Address Translation (DAT) 312 technologies including, but not limited to simply prefixing a virtual address with an offset value, translating the virtual address via one or more translation tables, the translation tables preferably comprising at least a segment table and a page table alone or in combination, preferably, the segment table having an entry pointing to the page table. In z/Architecture, a hierarchy of translation is provided including a region first table, a region second table, a region third table, a segment table and an optional page table. The performance of the address translation is often improved by utilizing a Translation Lookaside Buffer (TLB) which comprises entries mapping a virtual address to an associated physical memory location. The entries are created when DAT 312 translates a virtual address using the translation tables. Subsequent use of the virtual address can then utilize the entry of the fast TLB rather than the slow sequential Translation table accesses. TLB content may be managed by a variety of replacement algorithms including LRU (Least Recently used).

In the case where the Processor is a processor of a multi-processor system, each processor has responsibility to keep shared resources such as I/O, caches, TLBs and Memory interlocked for coherency. Typically "snoop" technologies will be utilized in maintaining cache coherency. In a snoop environment, each cache line may be marked as being in any one of a shared state, an exclusive state, a changed state, an invalid state and the like in order to facilitate sharing.

I/O units 304 provide the processor with means for attaching to peripheral devices including Tape, Disc, Printers, Displays, and networks for example. I/O units are often presented to the computer program by software Drivers. In Mainframes such as the z/Series from IBM. Channel Adapters and Open System Adapters are I/O units of the Mainframe that provide the communications between the operating system and peripheral devices.

The following description, in part from the "IBM z/Architecture Principles of Operation" published August 2010, reference number SA22-7832-08, describes an architectural view of a computer system:

Storage:

A computer system includes information in main storage, as well as addressing, protection, and reference and change recording. Some aspects of addressing include the format of addresses, the concept of address spaces, the various types of addresses, and the manner in which one type of address is translated to another type of address. Some of main storage includes permanently assigned storage locations. Main storage provides the system with directly addressable fast-access storage of data. Both data and programs must be loaded into main storage (from input devices) before they can be processed.

Main storage may include one or more smaller, faster-access buffer storages, sometimes called caches. A cache is typically physically associated with a CPU or an I/O processor. The effects, except on performance, of the physical construction and use of distinct storage media are generally not observable by the program.

Separate caches may be maintained for instructions and for data operands. Information within a cache is maintained in contiguous bytes on an integral boundary called a cache block or cache line (or line, for short). A model may provide an EXTRACT CACHE ATTRIBUTE instruction which returns the size of a cache line in bytes. A model may also provide PREFETCH DATA and PREFETCH DATA RELA- TIVE LONG instructions which effect the prefetching of storage into the data or instruction cache or the releasing of data from the cache.

Storage is viewed as a long horizontal string of bits. For most operations, accesses to storage proceed in a left-to-right sequence. The string of bits is subdivided into units of eight bits. An eight-bit unit is called a byte, which is the basic building block of all information formats. Each byte location in storage is identified by a unique nonnegative integer, which is the address of that byte location or, simply, the byte address. Adjacent byte locations have consecutive addresses, starting with 0 on the left and proceeding in a left-to-right sequence. Addresses are unsigned binary integers and are 24, 31, or 64 bits.

Information is transmitted between storage and a CPU or a channel subsystem one byte, or a group of bytes, at a time. Unless otherwise specified, a group of bytes in storage is addressed by the leftmost byte of the group. The number of bytes in the group is either implied or explicitly specified by the operation to be performed. When used in a CPU operation, a group of bytes is called a field. Within each group of bytes, bits are numbered in a left-to-right sequence. The leftmost bits are sometimes referred to as the "high-order" bits and the rightmost bits as the "low-order" bits. Bit numbers are not storage addresses, however. Only bytes can be addressed. To operate on individual bits of a byte in storage, it is necessary to access the entire byte. The bits in a byte are numbered 0 through 7, from left to right. The bits in an address may be numbered 8-31 or 40-63 for 24-bit addresses or 1-31 or 33-63 for 31-bit addresses; they are numbered 0-63 for 64-bit addresses. Within any other fixed-length format of multiple bytes, the bits making up the format are consecutively numbered starting from 0. For purposes of error detection, and in preferably for correction, one or more check bits may be transmitted with each byte or with a group of bytes. Such check bits are generated automatically by the machine and cannot be directly controlled by the program. Storage capacities are expressed in number of bytes. When the length of a storage-operand field is implied by the operation code of an instruction, the field is said to have a fixed length, which can be one, two, four, eight, or sixteen bytes. Larger fields may be implied for some instructions. When the length of a storage-operand field is not implied but is stated explicitly, the field is said to have a variable length. Variable-length operands can vary in length by increments of one byte. When information is placed in storage, the contents of only those byte locations are replaced that are included in the designated field, even though the width of the physical path to storage may be greater than the length of the field being stored.

Certain units of information must be on an integral boundary in storage. A boundary is called integral for a unit of information when its storage address is a multiple of the length of the unit in bytes. Special names are given to fields of 2, 4, 8, and 16 bytes on an integral boundary. A halfword is a group of two consecutive bytes on a two-byte boundary and is the basic building block of instructions. A word is a group of four consecutive bytes on a four-byte boundary. A doubleword is a group of eight consecutive bytes on an eight-byte boundary. A quadword is a group of 16 consecutive bytes on a 16-byte boundary. When storage addresses designate halfwords, words, doublewords, and quadwords, the binary representation of the address contains one, two, three, or four rightmost zero bits, respectively. Instructions must be on two-byte integral boundaries. The storage operands of most instructions do not have boundary-alignment requirements.

On models that implement separate caches for instructions and data operands, a significant delay may be experienced if the program stores into a cache line from which instructions are subsequently fetched, regardless of whether the store alters the instructions that are subsequently fetched.

Instructions:

Typically, operation of the CPU is controlled by instructions in storage that are executed sequentially, one at a time, left to right in an ascending sequence of storage addresses. A change in the sequential operation may be caused by branching, LOAD PSW, interruptions, SIGNAL PROCESSOR orders, or manual intervention.

Preferably an instruction comprises two major parts:

An operation code (op code), which specifies the operation to be performed

Optionally, the designation of the operands that participate.

Instruction formats of the z/Architecture are shown in FIGS. 5A-5F. An instruction can simply provide an Opcode 501, or an opcode and a variety of fields including immediate operands or register specifiers for locating operands in registers or in memory. The Opcode can indicate to the hardware that implied resources (operands etc.) are to be used such as one or more specific general purpose registers (GPRs). Operands can be grouped in three classes: operands located in registers, immediate operands, and operands in storage. Operands may be either explicitly or implicitly designated. Register operands can be located in general, floating-point, access, or control registers, with the type of register identified by the op code. The register containing the operand is specified by identifying the register in a four-bit field, called the R field, in the instruction. For some instructions, an operand is located in an implicitly designated register, the register being implied by the op code. Immediate operands are contained within the instruction, and the 8-bit, 16-bit, or 32-bit field containing the immediate operand is called the I field. Operands in storage may have an implied length; be specified by a bit mask: be specified by a four-bit or eight-bit length specification, called the L field, in the instruction; or have a length specified by the contents of a general register. The addresses of operands in storage are specified by means of a format that uses the contents of a general register as part of the address. This makes it possible to:

1. Specify a complete address by using an abbreviated notation.
2. Perform address manipulation using instructions which employ general registers for operands.
3. Modify addresses by program means without alteration of the instruction stream.
4. Operate independent of the location of data areas by directly using addresses received from other programs.

The address used to refer to storage either is contained in a register designated by the R field in the instruction or is calculated from a base address, index, and displacement, specified by the B, X, and D fields, respectively, in the instruction. When the CPU is in the access-register mode, a B or R field may designate an access register in addition to being used to specify an address. To describe the execution of instructions, operands are preferably designated as first and second operands and, in some cases, third and fourth operands. In general, two operands participate in an instruction execution, and the result replaces the first operand.

An instruction is one, two, or three halfwords in length and must be located in storage on a halfword boundary. Referring to FIGS. 5A-5F depicting instruction formats, each instruction is in one of 25 basic formats: E 501, I 502, RI 503 504, RIE 505 551 552 553 554, RIL 506 507, RIS 555, RR 510, RRE 511, RRF 512 513 514, RRS, RS 516 517, RSI 520, RSL 521, RSY 522 523, RX 524, RXE 525, RXF 526, RXY 527, S 530, SI 531, SIL 556, SIY 532, SS 533 534 535 536 537, SSE 541 and SSF 542, with three variations of RRF, two of RI, RIL, RS, and RSY, five of RIE and SS.

The format names indicate, in general terms, the classes of operands which participate in the operation and some details about fields:

RIS denotes a register-and-immediate operation and a storage operation.

RRS denotes a register-and-register operation and a storage operation.

SIL denotes a storage-and-immediate operation, with a 16-bit immediate field.

In the I, RR, RS, RSI, RX, SI, and SS formats, the first byte of an instruction contains the op code. In the E, RRE, RRF, S, SIL, and SSE formats, the first two bytes of an instruction contain the op code, except that for some instructions in the S format, the op code is in only the first byte. In the RI and RIL formats, the op code is in the first byte and bit positions 12-15 of an instruction. In the RIE, RIS, RRS, RSL, RSY, RXE, RXF, RXY, and SIY formats, the op code is in the first byte and the sixth byte of an instruction. The first two bits of the first or only byte of the op code specify the length and format of the instruction, as follows:

In the RR, RRE, RRF, RRR, RX, RXE, RXF, RXY, RS, RSY, RSI, RI, RIE, and RIL formats, the contents of the register designated by the $R_1$ field are called the first operand. The register containing the first operand is sometimes referred to as the "first operand location," and sometimes as "register $R_1$". In the RR, RRE, RRF and RRR formats, the $R_2$ field designates the register containing the second operand, and the $R_2$ field may designate the same register as $R_1$. In the RRF, RXF, RS, RSY, RSI, and RIE formats, the use of the $R_3$ field depends on the instruction. In the RS and RSY formats, the $R_3$ field may instead be an $M_3$ field specifying a mask. The R field designates a general or access register in the general instructions, a general register in the control instructions, and a floating-point register or a general register in the floating-point instructions. For general and control registers, the register operand is in bit positions 32-63 of the 64-bit register or occupies the entire register, depending on the instruction.

In the I format, the contents of the eight-bit immediate-data field, the I field of the instruction, are directly used as the operand. In the SI format, the contents of the eight-bit immediate-data field, the $I_2$ field of the instruction, are used directly as the second operand. The $B_1$ and $D_1$ fields specify the first operand, which is one byte in length. In the SIY format, the operation is the same except that $DH_1$ and $DL_1$ fields are used instead of a $D_1$ field. In the RI format for the instructions ADD HALFWORD IMMEDIATE, COMPARE HALFWORD IMMEDIATE, LOAD HALFWORD IMMEDIATE, and MULTIPLY HALFWORD IMMEDIATE, the contents of the 16-bit $I_2$ field of the instruction are used directly as a signed binary integer, and the $R_1$ field specifies the first operand, which is 32 or 64 bits in length, depending on the instruction. For the instruction TEST UNDER MASK (TMHH, TMHL, TMLH, TMLL), the contents of the $I_2$ field are used as a mask, and the $R_1$ field specifies the first operand, which is 64 bits in length.

For the instructions INSERT IMMEDIATE, AND IMMEDIATE, OR IMMEDIATE, and LOAD LOGICAL IMMEDIATE, the contents of the $I_2$ field are used as an unsigned binary integer or a logical value, and the $R_1$ field specifies the first operand, which is 64 bits in length. For the relative-branch instructions in the RI and RSI formats, the contents of the 16-bit $I_2$ field are used as a signed binary integer designating a number of halfwords. This number, when added to the address of the branch instruction, specifies the branch address. For relative-branch instructions in the RIL format, the $I_2$ field is 32 bits and is used in the same way.

For the relative-branch instructions in the RI and RSI formats, the contents of the 16-bit $I_2$ field are used as a signed binary integer designating a number of halfwords. This number, when added to the address of the branch instruction, specifies the branch address. For relative-branch instructions in the RIL format, the $I_2$ field is 32 bits and is used in the same way. For the RIE-format instructions COMPARE IMMEDIATE AND BRANCH RELATIVE and COMPARE LOGICAL IMMEDIATE AND BRANCH RELATIVE, the contents of the 8-bit $I_2$ field is used directly as the second operand. For the RIE-format instructions COMPARE IMMEDIATE AND BRANCH, COMPARE IMMEDIATE AND TRAP, COMPARE LOGICAL IMMEDIATE AND BRANCH, and COMPARE LOGICAL IMMEDIATE AND TRAP, the contents of the 16-bit $I_2$ field are used directly as the second operand. For the RIE-format instructions COMPARE AND BRANCH RELATIVE, COMPARE IMMEDIATE AND BRANCH RELATIVE, COMPARE LOGICAL AND BRANCH RELATIVE, and COMPARE LOGICAL IMMEDIATE AND BRANCH RELATIVE, the contents of the 16-bit I4 field are used as a signed binary integer designating a number of halfwords that are added to the address of the instruction to form the branch address.

For the RIL-format instructions ADD IMMEDIATE, ADD LOGICAL IMMEDIATE, ADD LOGICAL WITH SIGNED IMMEDIATE, COMPARE IMMEDIATE, COMPARE LOGICAL IMMEDIATE, LOAD IMMEDIATE, and MULTIPLY SINGLE IMMEDIATE, the contents of the 32-bit $I_2$ field are used directly as a the second operand.

For the RIS-format instructions, the contents of the 8-bit $I_2$ field are used directly as the second operand. In the SIL format, the contents of the 16-bit $I_2$ field are used directly as the second operand. The $B_1$ and $D_1$ fields specify the first operand, as described below.

In the RSL, SI, SIL, SSE, and most SS formats, the contents of the general register designated by the $B_1$ field are added to the contents of the $D_1$ field to form the first-operand address. In the RS, RSY, S, SIY, SS, and SSE formats, the contents of the general register designated by the $B_2$ field are added to the contents of the $D_2$ field or $DH_2$ and $DL_2$ fields to form the second-operand address. In the RX, RXE, RXF, and RXY formats, the contents of the general registers designated by the $X_2$ and $B_2$ fields are added to the contents of the $D_2$ field or $DH_2$ and $DL_2$ fields to form the second-operand address. In the RIS and RRS formats, and in one SS format, the contents of the general register designated by the $B_4$ field are added to the contents of the $D_4$ field to form the fourth-operand address.

In the SS format with a single, eight-bit length field, for the instructions AND (NC), EXCLUSIVE OR (XC), MOVE (MVC), MOVE NUMERICS, MOVE ZONES, and OR (OC), L specifies the number of additional operand bytes to the right of the byte designated by the first-operand address. Therefore, the length in bytes of the first operand is 1-256, corresponding to a length code in L of 0-255. Storage results replace the first operand and are never stored outside the field specified by the address and length. In this format, the second operand has the same length as the first operand. There are variations of the preceding definition that apply to EDIT, EDIT AND MARK, PACK ASCII, PACK UNICODE, TRANSLATE. TRANSLATE AND TEST, UNPACK ASCII, and UNPACK UNICODE.

In the SS format with two length fields, and in the RSL format, $L_1$ specifies the number of additional operand bytes to the right of the byte designated by the first-operand address. Therefore, the length in bytes of the first operand is 1-16, corresponding to a length code in $L_1$ of 0-15. Similarly, $L_2$ specifies the number of additional operand bytes to the right of the location designated by the second-operand address Results replace the first operand and are never stored outside the field specified by the address and length. If the first operand is longer than the second, the second operand is extended on the left with zeros up to the length of the first operand. This extension does not modify the second operand in storage. In the SS format with two R fields, as used by the MOVE TO PRIMARY, MOVE TO SECONDARY, and MOVE WITH KEY instructions, the contents of the general register specified by the $R_1$ field are a 32-bit unsigned value called the true length. The operands are both of a length called the effective length. The effective length is equal to the true length or 256, whichever is less. The instructions set the condition code to facilitate programming a loop to move the total number of bytes specified by the true length. The SS format with two R fields is also used to specify a range of registers and two storage operands for the LOAD MULTIPLE DISJOINT instruction and to specify one or two registers and one or two storage operands for the PERFORM LOCKED OPERATION instruction.

A zero in any of the $B_1$, $B_2$, $X_2$, or $B_4$ fields indicates the absence of the corresponding address component. For the absent component, a zero is used informing the intermediate sum, regardless of the contents of general register 0. A displacement of zero has no special significance.

Bits 31 and 32 of the current PSW are the addressing-mode bits. Bit 31 is the extended-addressing mode bit, and bit 32 is the basic-addressing-mode bit. These bits control the size of the effective address produced by address generation. When bits 31 and 32 of the current PSW both are zeros, the CPU is in the 24-bit addressing mode, and 24-bit instruction and operand effective addresses are generated. When bit 31 of the current PSW is zero and bit 32 is one, the CPU is in the 31-bit addressing mode, and 31-bit instruction and operand effective addresses are generated. When bits 31 and 32 of the current PSW are both one, the CPU is in the 64-bit addressing mode, and 64-bit instruction and operand effective addresses are generated. Execution of instructions by the CPU involves generation of the addresses of instructions and operands.

When an instruction is fetched from the location designated by the current PSW, the instruction address is increased by the number of bytes in the instruction, and the instruction is executed. The same steps are then repeated by using the new value of the instruction address to fetch the next instruction in the sequence. In the 24-bit addressing mode, instruction addresses wrap around, with the halfword at instruction address $2^{24}-2$ being followed by the halfword at instruction address 0. Thus, in the 24-bit addressing mode, any carry out of PSW bit position 104, as a result of updating the instruction address, is lost. In the 31-bit or 64-bit addressing mode, instruction addresses similarly wrap around, with the halfword at instruction address $2^{31}-2$ or $2^{64}-2$, respectively, followed by the halfword at instruction address 0. A carry out of PSW bit position 97 or 64, respectively, is lost.

An operand address that refers to storage is derived from an intermediate value, which either is contained in a register designated by an R field in the instruction or is calculated from the sum of three binary numbers: base address, index, and displacement. The base address (B) is a 64-bit number contained in a general register specified by the program in a four bit field, called the B field, in the instruction. Base addresses can be used as a means of independently addressing each program and data area. In array type calculations, it can designate the location of an array, and, in record-type processing, it can identify the record. The base address provides for addressing the entire storage. The base address may also be used for indexing.

The index (X) is a 64-bit number contained in a general register designated by the program in a four-bit field, called the X field, in the instruction. It is included only in the address specified by the RX-, RXE-, and RXY-format instructions. The RX-, RXE-, RXF-, and RXY-format instructions permit double indexing; that is, the index can be used to provide the address of an element within an array.

The displacement (D) is a 12-bit or 20-bit number contained in a field, called the D field, in the instruction. A 12-bit displacement is unsigned and provides for relative addressing of up to 4,095 bytes beyond the location designated by the base address. A 20-bit displacement is signed and provides for relative addressing of up to 524,287 bytes beyond the base address location or of up to 524,288 bytes before it. In array-type calculations, the displacement can be used to specify one of many items associated with an element. In the processing of records, the displacement can be used to identify items within a record. A 12-bit displacement is in bit positions 20-31 of instructions of certain formats. In instructions of some formats, a second 12-bit displacement also is in the instruction, in bit positions 36-47.

A 20-bit displacement is in instructions of only the RSY, RXY, or SIY format. In these instructions, the D field consists of a DL (low) field in bit positions 20-31 and of a DH (high) field in bit positions 32-39. When the long-displacement facility is installed, the numeric value of the displacement is formed by appending the contents of the DH field on the left of the contents of the DL field. When the long-displacement facility is not installed, the numeric value of the displacement is formed by appending eight zero bits on the left of the contents of the DL field, and the contents of the DH field are ignored.

In forming the intermediate sum, the base address and index are treated as 64-bit binary integers. A 12-bit displacement is treated as a 12-bit unsigned binary integer, and 52 zero bits are appended on the left. A 20-bit displacement is treated as a 20-bit signed binary integer, and 44 bits equal to the sign bit are appended on the left. The three are added as 64-bit binary numbers, ignoring overflow. The sum is always 64 bits long and is used as an intermediate value to form the generated address. The bits of the intermediate value are numbered 0-63. A zero in any of the $B_1$, $B_2$, $X_2$, or $B_4$ fields indicates the absence of the corresponding address component. For the absent component, a zero is used in forming the intermediate sum, regardless of the contents of general register 0. A displacement of zero has no special significance.

When an instruction description specifies that the contents of a general register designated by an R field are used to address an operand in storage, the register contents are used as the 64-bit intermediate value.

An instruction can designate the same general register both for address computation and as the location of an operand. Address computation is completed before registers, if any, are changed by the operation. Unless otherwise indicated in an individual instruction definition, the generated operand address designates the leftmost byte of an operand in storage.

The generated operand address is always 64 bits long, and the bits are numbered 0-63. The manner in which the generated address is obtained from the intermediate value depends on the current addressing mode. In the 24-bit addressing mode, bits 0-39 of the intermediate value are ignored, bits 0-39 of the generated address are forced to be zeros, and bits 40-63 of the intermediate value become bits 40-63 of the generated address. In the 31-bit addressing mode, bits 0-32 of the intermediate value are ignored, bits 0-32 of the generated address are forced to be zero, and bits 33-63 of the intermediate value become bits 33-63 of the generated address. In the 64-bit addressing mode, bits 0-63 of the intermediate value become bits 0-63 of the generated address. Negative values may be used in index and base-address registers. Bits 0-32 of these values are ignored in the 31-bit addressing mode, and bits 0-39 are ignored in the 24-bit addressing mode.

For branch instructions, the address of the next instruction to be executed when the branch is taken is called the branch address. Depending on the branch instruction, the instruction format may be RR, RRE, RX, RXY, RS, RSY, RSI, RI, RIE, or RIL. In the RS, RSY, RX, and RXY formats, the branch address is specified by a base address, a displacement, and, in the RX and RXY formats, an index. In these formats, the generation of the intermediate value follows the same rules as for the generation of the operand-address intermediate value. In the RR and RRE formats, the contents of the general register designated by the $R_2$ field are used as the intermediate value from which the branch address is formed. General register 0 cannot be designated as containing a branch address. A value of zero in the $R_2$ field causes the instruction to be executed without branching.

The relative-branch instructions are in the RSI, RI, RIE, and RIL formats. In the RSI, RI, and RIE formats for the relative-branch instructions, the contents of the $I_2$ field are treated as a 16-bit signed binary integer designating a number of halfwords. In the RIL format, the contents of the $I_2$ field are treated as a 32-bit signed binary integer designating a number of halfwords. The branch address is the number of halfwords designated by the $I_2$ field added to the address of the relative-branch instruction.

The 64-bit intermediate value for a relative branch instruction in the RSI, RI, RIE, or RIL format is the sum of two addends, with overflow from bit position 0 ignored. In the RSI, RI, or RIE format, the first addend is the contents of the $I_2$ field with one zero bit appended on the right and 47 bits equal to the sign bit of the contents appended on the left, except that for COMPARE AND BRANCH RELATIVE, COMPARE IMMEDIATE AND BRANCH RELATIVE, COMPARE LOGICAL AND BRANCH RELATIVE and COMPARE LOGICAL IMMEDIATE AND BRANCH RELATIVE, the first addend is the contents of the 14 field, with bits appended as described above for the $I_2$ field. In the RIL format, the first addend is the contents of the $I_2$ field with one zero bit appended on the right and 31 bits equal to the sign bit of the contents appended on the left. In all formats, the second addend is the 64-bit address of the branch instruction. The address of the branch instruction is the instruction address in the PSW before that address is updated to address the next sequential instruction, or it is the address of the target of the EXECUTE instruction if EXECUTE is used. If EXECUTE is used in the 24-bit or 31-bit addressing mode, the address of the branch instruction is the target address with 40 or 33 zeros, respectively, appended on the left.

The branch address is always 64 bits long, with the bits numbered 0-63. The branch address replaces bits 64-127 of the current PSW. The manner in which the branch address is obtained from the intermediate value depends on the addressing mode. For those branch instructions which change the addressing mode, the new addressing mode is used. In the 24-bit addressing mode, bits 0-39 of the intermediate value are ignored, bits 0-39 of the branch address are made zeros, and bits 40-63 of the intermediate value become bits 40-63 of the branch address. In the 31-bit addressing mode, bits 0-32 of the intermediate value are ignored, bits 0-32 of the branch address are made zeros, and bits 33-63 of the intermediate value become bits 33-63 of the branch address. In the 64-bit addressing mode, bits 0-63 of the intermediate value become bits 0-63 of the branch address.

For several branch instructions, branching depends on satisfying a specified condition. When the condition is not satisfied, the branch is not taken, normal sequential instruction execution continues, and the branch address is not used. When a branch is taken, bits 0-63 of the branch address replace bits 64-127 of the current PSW. The branch address is not used to access storage as part of the branch operation. A specification exception due to an odd branch address and access exceptions due to fetching of the instruction at the branch location are not recognized as part of the branch operation but instead are recognized as exceptions associated with the execution of the instruction at the branch location.

A branch instruction, such as BRANCH AND SAVE, can designate the same general register for branch address computation and as the location of an operand. Branch-address computation is completed before the remainder of the operation is performed.

The program-status word (PSW) contains information required for proper program execution. The PSW is used to control instruction sequencing and to hold and indicate the status of the CPU in relation to the program currently being executed. The active or controlling PSW is called the current PSW. Branch instructions perform the functions of decision making, loop control, and subroutine linkage. A branch instruction affects instruction sequencing by introducing a new instruction address into the current PSW. The relative-branch instructions with a 16-bit $I_2$ field allow branching to a location at an offset of up to plus 64K-2 bytes or minus 64K bytes relative to the location of the branch instruction, without the use of a base register. The relative-branch instructions with a 32-bit $I_2$ field allow branching to a location at an offset of up to plus 4 G-2 bytes or minus 4 G bytes relative to the location of the branch instruction, without the use of a base register.

Facilities for decision making are provided by the BRANCH ON CONDITION, BRANCH RELATIVE ON CONDITION, and BRANCH RELATIVE ON CONDITION LONG instructions. These instructions inspect a condition code that reflects the result of a majority of the arithmetic, logical, and I/O operations. The condition code, which consists of two bits, provides for four possible condition-code settings: 0, 1, 2, and 3.

The specific meaning of any setting depends on the operation that sets the condition code. For example, the condition code reflects such conditions as zero, nonzero, first operand high, equal, overflow, and subchannel busy. Once set, the condition code remains unchanged until modified by an instruction that causes a different condition code to be set.

Loop control can be performed by the use of BRANCH ON CONDITION, BRANCH RELATIVE ON CONDITION, and BRANCH RELATIVE ON CONDITION LONG to test the outcome of address arithmetic and counting operations. For some particularly frequent combinations of arithmetic and tests, BRANCH ON COUNT, BRANCH ON INDEX HIGH, and BRANCH ON INDEX LOW OR EQUAL are provided, and relative-branch equivalents of these instructions are also provided. These branches, being specialized, provide increased performance for these tasks.

Subroutine linkage when a change of the addressing mode is not required is provided by the BRANCH AND LINK and BRANCH AND SAVE instructions. (This discussion of BRANCH AND SAVE applies also to BRANCH RELATIVE AND SAVE and BRANCH RELATIVE AND SAVE LONG.) Both of these instructions permit not only the introduction of a new instruction address but also the preservation of a return address and associated information. The return address is the address of the instruction following the branch instruction in storage, except that it is the address of the instruction following an EXECUTE instruction that has the branch instruction as its target.

Both BRANCH AND LINK and BRANCH AND SAVE have an $R_1$ field. They form a branch address by means of fields that depend on the instruction. The operations of the instructions are summarized as follows: In the 24-bit addressing mode; both instructions place the return address in bit positions 40-63 of general register $R_1$ and leave bits 0-31 of that register unchanged. BRANCH AND LINK places the instruction-length code for the instruction and also the condition code and program mask from the current PSW in bit positions 32-39 of general register $R_1$ BRANCH AND SAVE places zeros in those bit positions.

In the 31-bit addressing mode, both instructions place the return address in bit positions 33-63 and a one in bit position 32 of general register $R_1$, and they leave bits 0-31 of the register unchanged.

In the 64-bit addressing mode, both instructions place the return address in bit positions 0-63 of general register $R_1$.

In any addressing mode, both instructions generate the branch address under the control of the current addressing mode. The instructions place bits 0-63 of the branch address in bit positions 64-127 of the PSW. In the RR format, both instructions do not perform branching if the $R_2$ field of the instruction is zero.

It can be seen that, in the 24-bit or 31-bit addressing mode, BRANCH AND SAVE places the basic addressing-mode bit, bit 32 of the PSW, in bit position 32 of general register $R_1$. BRANCH AND LINK does so in the 31-bit addressing mode. The instructions BRANCH AND SAVE AND SET MODE and BRANCH AND SET MODE are for use when a change of the addressing mode is required during linkage. These instructions have $R_1$ and $R_2$ fields. The operations of the instructions are summarized as follows:

BRANCH AND SAVE AND SET MODE sets the contents of general register $R_1$ the same as BRANCH AND SAVE. In addition, the instruction places the extended-addressing-mode bit, bit 31 of the PSW, in bit position 63 of the register.

BRANCH AND SET MODE, if $R_1$ is nonzero, performs as follows. In the 24- or 31-bit mode, it places bit 32 of the PSW in bit position 32 of general register $R_1$, and it leaves bits 0-31 and 33-63 of the register unchanged. Note that bit 63 of the register should be zero if the register contains an instruction address. In the 64-bit mode, the instruction places bit 31 of the PSW (a one) in bit position 63 of general register $R_1$, and it leaves bits 0-62 of the register unchanged.

When $R_2$ is nonzero, both instructions set the addressing mode and perform branching as follows. Bit 63 of general register $R_2$ is placed in bit position 31 of the PSW. If bit 63 is zero, bit 32 of the register is placed in bit position 32 of the PSW. If bit 63 is one, PSW bit 32 is set to one. Then the branch address is generated from the contents of the register, except with bit 63 of the register treated as a zero, under the control of the new addressing mode. The instructions place bits 0-63 of the branch address in bit positions 64-127 of the PSW. Bit 63 of general register $R_2$ remains unchanged and, therefore, may be one upon entry to the called program. If $R_2$ is the same as $R_1$, the results in the designated general register are as specified for the $R_1$ register.

Interruptions (Context Switch):

The interruption mechanism permits the CPU to change its state as a result of conditions external to the configuration, within the configuration, or within the CPU itself. To permit fast response to conditions of high priority and immediate recognition of the type of condition, interruption conditions are grouped into six classes: external, input/output, machine check, program, restart, and supervisor call.

An interruption consists in storing the current PSW as an old PSW, storing information identifying the cause of the interruption, and fetching a new PSW. Processing resumes as specified by the new PSW. The old PSW stored on an interruption normally contains the address of the instruction that would have been executed next had the interruption not occurred, thus permitting resumption of the interrupted program. For program and supervisor-call interruptions, the information stored also contains a code that identifies the length of the last-executed instruction, thus permitting the program to respond to the cause of the interruption. In the case of some program conditions for which the normal response is re-execution of the instruction causing the interruption, the instruction address directly identifies the instruction last executed.

Except for restart, an interruption can occur only when the CPU is in the operating state. The restart interruption can occur with the CPU in either the stopped or operating state.

Any access exception is recognized as part of the execution of the instruction with which the exception is associated. An access exception is not recognized when the CPU attempts to prefetch from an unavailable location or detects some other access-exception condition, but a branch instruction or an interruption changes the instruction sequence such that the instruction is not executed. Every instruction can cause an access exception to be recognized because of instruction fetch. Additionally, access exceptions associated with instruction execution may Occur because of an access to an operand in storage. An access exception due to fetching an instruction is indicated when the first instruction halfword cannot be fetched without encountering the exception. When the first halfword of the instruction has no access exceptions, access exceptions may be indicated for additional halfwords according to the instruction length specified by the first two bits of the instruction; however, when the operation can be performed without accessing the second or third halfwords of the instruction, it is unpredictable whether the access exception is indicated for the unused part. Since the indication of access exceptions for instruction fetch is common to all instructions, it is not covered in the individual instruction definitions.

Except where otherwise indicated in the individual instruction description, the following rules apply for exceptions associated with an access to an operand location. For a fetch-type operand, access exceptions are necessarily indicated only for that portion of the operand which is required for completing the operation. It is unpredictable whether access exceptions are indicated for those portions of a fetch-type operand which are not required for completing the operation.

For a store-type operand, access exceptions are recognized for the entire operand even if the operation could be completed without the use of the inaccessible part of the operand. In situations where the value of a store-type operand is defined to be unpredictable, it is unpredictable whether an access exception is indicated. Whenever an access to an operand location can cause an access exception to be recognized, the word "access" is included in the list of program exceptions in the description of the instruction. This entry also indicates which operand can cause the exception to be recognized and whether the exception is recognized on a fetch or store access to that operand location. Access exceptions are recognized only for the portion of the operand as defined for each particular instruction.

An operation exception is recognized when the CPU attempts to execute an instruction with an invalid operation code. The operation code may be unassigned, or the instruction with that operation code may not be installed on the CPU. The operation is suppressed. The instruction-length code is 1, 2, or 3. The operation exception is indicated by a program interruption code of 0001 hex (or 0081 hex if a concurrent PER event is indicated).

Some models may offer instructions not described in this publication, such as those provided for assists or as part of special or custom features. Consequently, operation codes not described in this publication do not necessarily cause an operation exception to be recognized. Furthermore, these instructions may cause modes of operation to be set up or may otherwise alter the machine so as to affect the execution of subsequent instructions. To avoid causing such an operation, an instruction with an operation code not described in this publication should be executed only when the specific function associated with the operation code is desired.

A specification exception is recognized when any of the following is true:

1. A one is introduced into an unassigned bit position of the PSW (that is, any of bit positions 0, 2-4, 24-30, or 33-63). This is handled as an early PSW specification exception.

2. A one is introduced into bit position 12 of the PSW. This is handled as an early PSW specification exception.

3. The PSW is invalid in any of the following ways: a. Bit 31 of the PSW is one and bit 32 is zero. b. Bits 31 and 32 of the PSW are zero, indicating the 24-bit addressing mode, and bits 64-103 of the PSW are not all zeros. c. Bit 31 of the PSW is zero and bit 32 is one, indicating the 31-bit addressing mode, and bits 64-96 of the PSW are not all zeros. This is handled as an early PSW specification exception.

4. The PSW contains an odd instruction address.

5. An operand address does not designate an integral boundary in an instruction requiring such integral-boundary designation.

6. An odd-numbered general register is designated by an R field of an instruction that requires an even-numbered register designation.

7. A floating-point register other than 0, 1, 4, 5, 8, 9, 12, or 13 is designated for an extended operand.

8. The multiplier or divisor in decimal arithmetic exceeds 15 digits and sign.

9. The length of the first-operand field is less than or equal to the length of the second-operand field in decimal multiplication or division.

10. Execution of CIPHER MESSAGE, CIPHER MESSAGE WITH CHAINING, COMPUTE INTERMEDIATE MESSAGE DIGEST, COMPUTE LAST MESSAGE DIGEST, or COMPUTE MESSAGE AUTHENTICATION CODE is attempted, and the function code in bits 57-63 of general register 0 contain an unassigned or uninstalled function code.

11. Execution of CIPHER MESSAGE or CIPHER MESSAGE WITH CHAINING is attempted, and the $R_1$ or $R_2$ field designates an odd-numbered register or general register 0.

12. Execution of CIPHER MESSAGE, CIPHER MESSAGE WITH CHAINING, COMPUTE INTERMEDIATE MESSAGE DIGEST or COMPUTE MESSAGE AUTHENTICATION CODE is attempted, and the second operand length is not a multiple of the data block size of the designated function. This specification-exception condition does not apply to the query functions.

13. Execution of COMPARE AND FORM CODEWORD is attempted, and general registers 1, 2, and 3 do not initially contain even values.

32. Execution of COMPARE AND SWAP AND STORE is attempted and any of the following conditions exist:

The function code specifies an unassigned value.

The store characteristic specifies an unassigned value.

The function code is 0, and the first operand is not designated on a word boundary.

The function code is 1, and the first operand is not designated on a doubleword boundary.

The second operand is not designated on an integral boundary corresponding to the size of the store value.

33. Execution of COMPARE LOGICAL LONG UNICODE or MOVE LONG UNICODE is attempted, and the contents of either general register $R_1+1$ or $R_3+1$ do not specify an even number of bytes. 34. Execution of COMPARE LOGICAL STRING, MOVE STRING or SEARCH STRING is attempted, and bits 32-55 of general register 0 are not all zeros. 35. Execution of COMPRESSION CALL is attempted, and bits 48-51 of general register 0 have any of the values 0000 and 0110-1111 binary. 36. Execution of COMPUTE INTERMEDIATE MESSAGE DIGEST, COMPUTE LAST MESSAGE DIGEST, or COMPUTE MESSAGE AUTHENTICATION CODE is attempted, and either of the following is true:

The $R_2$ field designates an odd-numbered register or general register 0.

Bit 56 of general register 0 is not zero.

37. Execution of CONVERT HFP TO BFP, CONVERT TO FIXED (BFP or HFP), or LOAD FP INTEGER (BFP) is attempted, and the $M_3$ field does not designate a valid modifier.

38. Execution of DIVIDE TO INTEGER is attempted, and the $M_4$ field does not designate a valid modifier.

39. Execution of EXECUTE is attempted, and the target address is odd.

40. Execution of EXTRACT STACKED STATE is attempted, and the code in bit positions 56-63 of general register $R_2$ is greater than 4 when the ASN-and-LX-reuse facility is not installed or is greater than 5 when the facility is installed.

41. Execution of FIND LEFTMOST ONE is attempted, and the $R_1$ field designates an odd numbered register.

42. Execution of INVALIDATE DAT TABLE ENTRY is attempted, and bits 44-51 of general register $R_2$ are not all zeros.

43. Execution of LOAD FPC is attempted, and one or more bits of the second operand corresponding to unsupported bits in the FPC register are one.

44. Execution of LOAD PAGE-TABLE-ENTRY ADDRESS is attempted and the $M_4$ field of the instruction contains any value other than 0000-0100 binary.

45. Execution of LOAD PSW is attempted and bit 12 of the doubleword at the second-operand address is zero. It is model dependent whether or not this exception is recognized.

46. Execution of MONITOR CALL is attempted, and bit positions 8-11 of the instruction do not contain zeros.

47. Execution of MOVE PAGE is attempted, and bit positions 48-51 of general register 0 do not contain zeros or bits 52 and 53 of the register are both one.

48. Execution of PACK ASCII is attempted, and the $L_2$ field is greater than 31.

49. Execution of PACK UNICODE is attempted, and the $L_2$ field is greater than 63 or is even.

50. Execution of PERFORM FLOATING POINT OPERATION is attempted, bit 32 of general register 0 is zero, and one or more fields in bits 33-63 are invalid or designate an uninstalled function.

51. Execution of PERFORM LOCKED OPERATION is attempted, and any of the following is true: The T bit, bit 55 of general register 0 is zero, and the function code in bits 56-63 of the register is invalid. Bits 32-54 of general register 0 are not all zeros. In the access-register mode, for function codes that cause use of a parameter list containing an ALET, the $R_3$ field is zero.

52. Execution of PERFORM TIMING FACILITY FUNCTION is attempted, and either of the following is true: Bit 56 of general register 0 is not zero. Bits 57-63 of general register 0 specify an unassigned or uninstalled function code.

53. Execution of PROGRAM TRANSFER or PROGRAM TRANSFER WITH INSTANCE is attempted, and all of the following are true: The extended-addressing-mode bit in the PSW is zero. The basic-addressing-mode bit, bit 32, in the general register designated by the $R_2$ field of the instruction is zero. Bits 33-39 of the instruction address in the same register are not all zeros.

54. Execution of RESUME PROGRAM is attempted, and either of the following is true: Bits 31, 32, and 64-127 of the PSW field in the second operand are not valid for placement in the current PSW. The exception is recognized if any of the following is true:

Bits 31 and 32 are both zero and bits 64-103 are not all zeros.

Bits 31 and 32 are zero and one, respectively, and bits 64-96 are not all zeros.

Bits 31 and 32 are one and zero, respectively.

Bit 127 is one. Bits 0-12 of the parameter list are not all zeros.

55. Execution of SEARCH STRING UNICODE is attempted, and bits 32-47 of general register 0 are not all zeros.

56. Execution of SET ADDRESS SPACE CONTROL or SET ADDRESS SPACE CONTROL FAST is attempted, and bits 52 and 53 of the second-operand address are not both zeros.

57. Execution of SET ADDRESSING MODE (SAM24) is attempted, and bits 0-39 of the un-updated instruction address in the PSW, bits 64-103 of the PSW, are not all zeros.

58. Execution of SET ADDRESSING MODE (SAM31) is attempted, and bits 0-32 of the un-updated instruction address in the PSW, bits 64-96 of the PSW, are not all zeros.

59. Execution of SET CLOCK PROGRAMMABLE FIELD is attempted, and bits 32-47 of general register 0 are not all zeros.

60. Execution of SET FPC is attempted, and one or more bits of the first operand corresponding to unsupported bits in the FPC register are one.

61. Execution of STORE SYSTEM INFORMATION is attempted, the function code in general register 0 is valid, and either of the following is true: Bits 36-55of general register 0 and bits 32-47 of general register 1 are not all zeros. The second-operand address is not aligned on a 4K-byte boundary.

62. Execution of TRANSLATE TWO TO ONE or TRANSLATE TWO TO TWO is attempted, and the length in general register $R_1+1$ does not specify an even number of bytes.

63. Execution of UNPACK ASCII is attempted, and the $L_1$ field is greater than 31.

64. Execution of UNPACK UNICODE is attempted, and the $L_1$ field is greater than 63 or is even.

65. Execution of UPDATE TREE is attempted, and the initial contents of general registers 4 and 5 are not a multiple of 8 in the 24-bit or 31-bit addressing mode or are not a multiple of 16 in the 64-bit addressing mode. The execution of the instruction identified by the old PSW is suppressed. However, for early PSW specification exceptions (causes 1-3) the operation that introduces the new PSW is completed, but an interruption occurs immediately thereafter. Preferably, the instruction-length code (ILC) is 1, 2, or 3, indicating the length of the instruction causing the exception. When the instruction address is odd (cause 4), it is unpredictable whether the ILC is 1, 2, or 3. When the exception is recognized because of an early PSW specification exception (causes 1-3) and the exception has been introduced by LOAD PSW, LOAD PSW EXTENDED, PROGRAM RETURN, or an interruption, the ILC is 0. When the exception is introduced by SET ADDRESSING MODE (SAM24, SAM31), the ILC is 1, or it is 2 if SET ADDRESSING MODE was the target of EXECUTE. When the exception is introduced by SET SYSTEM MASK or by STORE THEN OR SYSTEM MASK, the ILC is 2.

Program interruptions are used to report exceptions and events which occur during execution of the program. A program interruption causes the old PSW to be stored at real locations 336-351 and a new PSW to be fetched from real locations 464-479. The cause of the interruption is identified by the interruption code. The interruption code is placed at real locations 142-143, the instruction-length code is placed in bit positions 5 and 6 of the byte at real location 141 with the rest of the bits set to zeros, and zeros are stored at real location 140. For some causes, additional information identifying the reason for the interruption is stored at real locations 144-183. If the PER-3 facility is installed, then, as part of the program interruption action, the contents of the breaking-event-address register are placed in real storage locations 272-279. Except for PER events and the crypto-operation exception, the condition causing the interruption is indicated by a coded value placed in the rightmost seven bit positions of the interruption code. Only one condition at a time can be indicated. Bits 0-7 of the interruption code are set to zeros. PER events are indicated by setting bit 8 of the interruption code to one. When this is the only condition, bits 0-7 and 9-15 are also set to zeros. When a PER event is indicated concurrently with another program interruption condition, bit 8 is one, and bits 0-7 and 9-15 are set as for the other condition. The crypto-operation exception is indicated by an interruption code of 0119 hex, or 0199 hex if a PER event is also indicated.

When there is a corresponding mask bit, a program interruption can occur only when that mask bit is one. The program mask in the PSW controls four of the exceptions, the IEEE masks in the FPC register control the IEEE exceptions, bit 33 in control register 0 controls whether SET SYSTEM MASK causes a special-operation exception, bits 48-63 in control register 8 control interruptions due to monitor events, and a hierarchy of masks control interruptions due to PER events. When any controlling mask bit is zero, the condition is ignored; the condition does not remain pending.

When the new PSW for a program interruption has a PSW-format error or causes an exception to be recognized in the process of instruction fetching, a string of program interruptions may occur.

Some of the conditions indicated as program exceptions may be recognized also by the channel subsystem, in which case the exception is indicated in the subchannel-status word or extended-status word.

When a data exception causes a program interruption, a data-exception code (DXC) is stored at location 147, and zeros are stored at locations 144-146. The DXC distinguishes between the various types of data-exception conditions. When the AFP-register (additional floating-point register) control bit, bit 45 of control register 0, is one, the DXC is also placed in the DXC field of the floating-point-control (FPC) register. The DXC field in the FPC register remains unchanged when any other program exception is reported. The DXC is an 8-bit code indicating the specific cause of a data exception.

DXC 2 and 3 are mutually exclusive and are of higher priority than any other DXC. Thus, for example, DXC 2 (BFP instruction) takes precedence over any IEEE exception; and DXC 3 (DFP instruction) takes precedence over any IEEE exception or simulated IEEE exception. As another example, if the conditions for both DXC 3 (DFP instruction) and DXC 1 (AFP register) exist, DXC 3 is reported. When both a specification exception and an AFP register data exception apply, it is unpredictable which one is reported.

An addressing exception is recognized when the CPU attempts to reference a main-storage location that is not available in the configuration. A main-storage location is not available in the configuration when the location is not installed, when the storage unit is not in the configuration, or when power is off in the storage unit. An address designating a storage location that is not available in the configuration is referred to as invalid. The operation is suppressed when the address of the instruction is invalid. Similarly, the operation is suppressed when the address of the target instruction of EXECUTE is invalid. Also, the unit of operation is suppressed when an addressing exception is encountered in accessing a table or table entry. The tables and table entries to which the rule applies are the dispatchable-unit-control table, the primary ASN second-table entry, and entries in the access list, region first table, region second table, region third table, segment table, page table, linkage table, linkage-first table, linkage-second table, entry table, ASN first table, ASN second table, authority table, linkage stack, and trace table. Addressing exceptions result in suppression when they are encountered for references to the region first table, region second table, region third table, segment table, and page table, in both implicit references for dynamic address translation and references associated with the execution of LOAD PAGE-TABLE-ENTRY ADDRESS, LOAD REAL ADDRESS, STORE REAL ADDRESS, and TEST PROTECTION. Similarly, addressing exceptions for accesses to the dispatchable-unit control table, primary ASN-second-table entry, access list, ASN second table, or authority table result in suppression when they are encountered in access-register translation done either implicitly or as part of LOAD PAGE-TABLE-ENTRY ADDRESS, LOAD REAL ADDRESS, STORE REAL ADDRESS, TEST ACCESS, or TEST PROTECTION. Except for some specific instructions whose execution is suppressed, the operation is terminated for an operand address that can be translated but designates an unavailable location. For termination, changes may occur only to result fields. In this context, the term "result field" includes the condition code, registers, and any storage locations that are provided and that are designated to be changed by the instruction.

Storage-Operand Fetch References:

When the bytes of a storage operand participate in the instruction execution only as a source, the operand is called a fetch-type operand, and the reference to the location is called a storage-operand fetch reference. A fetch-type operand is identified in individual instruction definitions by indicating that the access exception is for fetch.

All bits within a single byte of a fetch-type operand are accessed concurrently. When an operand consists of more than one byte, the bytes may be fetched from storage piecemeal, one byte at a time. Unless otherwise specified, the bytes are not necessarily fetched in any particular sequence.

The storage-operand fetch references of one instruction occur after those of all preceding instructions and before those of subsequent instructions, as observed by other CPUs and by channel programs. The operands of any one instruction are fetched in the sequence specified for that instruction. The CPU may fetch the operands of instructions before the instructions are executed. There is no defined limit on the length of time between when an operand is fetched and when it is used. Still, as observed by the CPU itself, its storage-operand references are performed in the conceptual sequence.

For certain special instructions, the fetch references for multiple operands may appear to be locked against certain accesses by other CPUs and by channel programs. Such a fetch reference is called an interlocked-fetch reference. The fetch accesses associated with an interlocked-fetch reference do not necessarily occur one immediately after the other, but all store accesses by other CPUs may not occur at the same locations as the interlocked-fetch reference between the fetch accesses of the interlocked fetch reference.

The storage-operand fetch reference for the LOAD PAIR DISJOINT instruction may appear to be an interlocked-fetch reference. Whether or not LOAD PAIR DISJOINT is able to fetch both operands by means of an interlocked fetch is indicated by the condition code.

Storage-Operand Store References:

When the bytes of a storage operand participate in the instruction execution only as a destination, to the extent of being replaced by the result, the operand is called a store-type operand, and the reference to the location is called a storage-operand store reference. A store-type operand is identified in individual instruction definitions by indicating that the access exception is for store.

All bits within a single byte of a store-type operand are accessed concurrently. When an operand consists of more than one byte, the bytes may be placed in storage piecemeal, one byte at a time. Unless otherwise specified, the bytes are not necessarily stored in any particular sequence.

The CPU may delay placing results in storage. There is no defined limit on the length of time that results may remain pending before they are stored. This delay does not affect the sequence in which results are placed in storage.

The results of one instruction are placed in storage after the results of all preceding instructions have been placed in storage and before any results of the succeeding instructions are stored, as observed by other CPUs and by channel programs. The results of any one instruction are stored in the sequence specified for that instruction.

The CPU does not fetch operands, ART-table entries, or DAT-table entries from a storage location until all information destined for that location by the CPU has been stored. Prefetched instructions may appear to be updated before the information appears in storage.

The stores are necessarily completed only as a result of a serializing operation and before the CPU enters the stopped state.

Block-Concurrent References

For some references, the accesses to all bytes within a halfword, word, doubleword, or quadword are specified to appear to be block concurrent as observed by other CPUs and channel programs. The halfword, word, doubleword, or quadword is referred to in this section as a block. When a fetch-type reference is specified to appear to be concurrent within a block, no store access to the block by another CPU or channel program is permitted during the time that bytes contained in the block are being fetched. When a store-type reference is specified to appear to be concurrent within a block, no access to the block, either fetch or store, is permitted by another CPU or channel program during the time that the bytes within the block are being stored.

CPU Serialization:

In the following discussion, the term serializing instruction refers to an instruction which causes one or more serialization functions to be performed. The term serializing operation refers to a unit of operation within an instruction or to a machine operation such as an interruption which causes a serialization function is performed.

The sequence of events associated with a serializing operation is as follows:

1. All conceptually previous storage accesses by the CPU are completed as observed by other CPUs and by channel programs. This includes all conceptually previous stores and changes to the storage keys.

2. The normal function associated with the serializing operation is performed. In the case of instruction execution, operands are fetched, and the storing of results is completed. The exceptions are LOAD PSW, LOAD PSW EXTENDED, and SET PREFIX, in which the operand may be fetched before previous stores have been completed, and interruptions, in which the interruption code and associated fields may be stored prior to the serialization. The fetching of the serializing instruction occurs before the execution of the instruction and may precede the execution of previous instructions, but may not precede the completion of any previous serializing operation. In the case of an interruption, the old PSW, the interruption code, and other information, if any, are stored, and the new PSW is fetched, but not necessarily in that sequence.

3. Finally, instruction fetch and operand accesses for conceptually subsequent operations may begin.

A serializing function affects the sequence of storage accesses that are under the control of the CPU in which the serializing function takes place. It does not affect the sequence of storage accesses under the control of other CPUs and of channel programs.

Specific-Operand Serialization

Certain instructions cause specific-operand serialization to be performed for an operand of the instruction. As observed by other CPUs and by the channel subsystem, a specific-operand-serialization operation consists in completing all conceptually previous storage accesses by the CPU before conceptually subsequent accesses to the specific storage operand of the instruction may occur. At the completion of an instruction causing specific-operand serialization, the instruction's store is completed as observed by other CPUs and channel programs.

Figure 6:
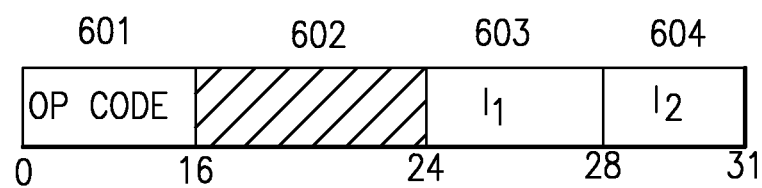
FIG. 6 illustrates one embodiment of an instruction format according to an embodiment.

One embodiment of an instruction format according to an embodiment is described with reference to FIG. 6. This instruction format may also be known as a Next Instruction Access Intent instruction (NIAI). This instruction format may comprise an operation code field 601 indicating that this is a Next Instruction Access Intent" instruction. This may be located in bit 0 through and including bit 15 of the instruction. There may also be a reserved field 602 which may be located in bit 16 though and including bit 23, and which may contain zeros. This instruction format may also comprise fields or operands, such as an access intent control field 603 ($I_1$), which may be located in bit 24 through and including bit 274, and another access intent control field 604 ($I_2$), which may be located in bit 28 through and including bit 31.

For this instruction format embodiment, the term primary-access operand means the lowest numbered storage operand of an instruction. Similarly, the term secondary-access operand means the next-lowest numbered storage operand of the instruction. These terms do not have the same meaning as the terms first operand and second operand, even though there may be some correlation. For example, for the MOVE Instruction, the first operand is the primary-access operand and the second operand is the secondary-access operand. However, for the LOAD MULTIPLE DISJOINT instruction, the second operand is the primary-access operand and the fourth operand is the secondary-access operand.

Subject to the controls in the $I_1$ 603 and $I_2$ 604 fields, the CPU is signaled the future access intent for either or both the primary-access and secondary-access operands of the next-sequential instruction. The next-sequential instruction may be the instruction retrieved and executed after the NIAI instruction. The $I_1$ 603 field contains a code to signal the CPU the access intent for the primary-access operand of the next-sequential instruction. The $I_2$ 604 field contains a code to signal the CPU the access intent for the secondary-access operand of the next-sequential instruction. When the next-sequential instruction has only a single storage operand, the $I_2$ 604 field is ignored.

One embodiment of an instruction format may include a single access intent field. Another embodiment of an instruction format may include two access intent fields. Another embodiment of an instruction format may include multiple access intent fields. Another embodiment of an instruction format may include a field or operand that contains a value specifying the number of subsequent next-sequential instructions.

Figure 7:
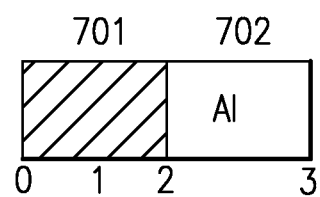
FIG. 7 illustrates an embodiment of an access intent control field of an instruction format according to an embodiment.

One embodiment of an access intent control field of an instruction format according to an embodiment is described with reference to FIG. 7. An access intent field may comprise a reserved field 701 and may be located in bits 0-1, which may contain zeros for program compatibility reasons. It may further comprise an access intent field 702 (AI) and may be located in bits 2-3.

The access intent control fields ($I_1$ 603 and $I_2$ 604) may contain an unsigned integer that is used as a code to signal the CPU the access intent for the corresponding operand of the next-sequential instruction as follows:

If the access intent control field contains a 0 value, then the corresponding operand of the next-sequential instruction may or may not be accessed as an instruction operand by subsequent instruction(s) after the next-sequential instruction. In one embodiment, the next-sequential instruction may be treated normally, for example the cache will function as if no NIAI instruction was ever present.

If the access intent control field contains a 1 value, then the corresponding operand of the next-sequential instruction will be accessed by subsequent instruction(s) for operand store access, and may also be accessed for operand fetch access. In one embodiment, the 1 value may tell the processor to store the operand of the next-sequential instruction in the cache of the processor, to request exclusive ownership of the cache line for the processor, and to execute the next-sequential instruction in the processor. In one embodiment with a processor and a co-processor, the 1 value may tell the processor to store the operand of the next-sequential instruction in the cache of the processor, to request exclusive ownership of the cache line for the processor, and to execute the next-sequential instruction in the processor instead of the co-processor, where the co-processor is, for example, a specialty engine or processor extension. In one embodiment with a processor and a co-processor, the 1 value may tell the processor to store the operand of the next-sequential instruction in the cache of the processor, to have a request for exclusive ownership of the cache line for the processor, and to execute the next-sequential instruction in the co-processor, where the co-processor is, for example, a specialty engine, or processor extension. In one embodiment, the co-processor contains an independent cache, thus when the co-processor executes the next-sequential instruction, the operand stored in the independent cache is migrated to the cache located in the processor in an exclusive ownership state. In one embodiment, the co-processor shares a cache with the processor, so no migration is necessary. In one embodiment, the co-processor is a second processor.

If the access intent control field contains a 2 value, then the corresponding operand of the next-sequential instruction will be accessed by subsequent instruction(s) for operand fetch access. In one embodiment, in the case where the next-sequential instruction may be performed at or near main memory, when the access intent control field contains a 2, this may instruct the processor to use a local cache instead of main memory when dealing with the next-sequential instruction, and to request a shared cache line for the processor. In one embodiment, the 2 value may instruct the processor to use a certain level of cache instead of the local cache, and to request a shared cache line for the processor. In one embodiment, the shared cache line enables data to be shared between multiple processors in a read-only state. In one embodiment, the 2 value may tell the processor to store the operand of the next-sequential instruction in the cache of the processor, to have a request for shared access of the cache line for the processor, and to execute the next-sequential instruction on the processor. In one embodiment with a processor and a co-processor, the 2 value may tell the processor to store the operand of the next-sequential instruction in the cache of the processor, to have a request for shared access of the cache line for the processor, and to execute the next-sequential instruction on the processor instead of the co-processor, where the co-processor is, for example, a specialty engine or processor extension. In one embodiment with a processor and a co-processor, the 2 value may tell the processor to store the operand of the next-sequential instruction in the cache of the processor, to have a request for shared access of the cache line for the processor, and to execute the next-sequential instruction on the co-processor, where the co-processor is, for example, a specialty engine or processor extension. In one embodiment, the co-processor contains an independent cache, thus when the co-processor executes the next-sequential instruction, the operand stored in the independent cache is migrated to the cache located in the processor. In one embodiment, the co-processor shares a cache with the processor, so no migration is necessary. In one embodiment, the co-processor is a second processor.

If the access intent control field contains a 3 value, then the corresponding operand of the next-sequential instruction will not be accessed by subsequent instruction(s). This may specify to the processor to actively release a cache line ownership from the cache for the specified operand in the next-sequential instruction after it is finished. It may also signal the processor that it should not actively try to retain that cache line in the cache. In one embodiment, when using LRU replacement algorithm, the LRU state may not be updated in the cache. In one embodiment, the LRU may be updated to any state other than the MRU state, for example in replacement algorithms with multiple LRU states, it may be updated to a first, second, third, etc. LRU state. In one embodiment, the 3 value may tell the processor to not load the operand of the next-sequential instruction into the cache, and may tell the processor to execute the next-sequential instruction outside of the processor. In one embodiment, the 3 value may tell the processor to not load the operand of the next-sequential instruction into the cache, and may tell the processor to execute the next-sequential instruction in memory instead of the processor. In one embodiment with a processor and a co-processor, the 3 value may tell the processor to not load the operand of the next-sequential instruction into the cache, and may tell the processor to execute the next-sequential instruction in the co-processor through the co-processor's cache, where the co-processor is, for example, a specialty engine or processor extension.

In an example of a usage when any access intent control field contains a 1 or 2 value, a next-sequential instruction may be a move-long instruction which in a normal setting is used to move data from one storage location to a second storage location directly at or near memory without the use of the local cache. However, when the access intent control field contains a 1 or 2, the data may be moved from one storage location into cache and then from the cache into the second storage location, thus allowing for the reuse of the operand stored in cache in subsequent instruction(s). When the access intent instruction field does not contain a 1 or 2, the data is transferred directly from memory to memory without any updates to the cache. Thus, in this example, the 1 or 2 value allows control over storing moved data into cache when dealing with a move instruction. This is just one example of a next-sequential instruction and is not limited to only the move instruction.

Depending on the model of the CPU, the CPU may not necessarily recognize all of the access intents for an operand. For access intents that are not recognized by the CPU, the instruction may act as a no-operation. A no-operation is when an instruction does not actually perform an operation, e.g. an ADD instruction with a 0. If the instruction has more than two storage operands, for the embodiment where there are two access intent control fields ($I_1$ 603 and $I_2$ 604), no access intent may be specified for the additional operands. Depending on the model, the CPU may not necessarily recognize access intents for a particular instruction. For such cases, the instruction may act as a no-operation. The Next Instruction Access Intent instruction may only affect subsequent instruction's operand accesses.

In one embodiment, the NIAI ("Next Instruction Access Intent") instruction may be expanded to "next set of instructions access intent". In this embodiment, the intent of a number of sequential instructions is specified together using one NIAI instruction. In one embodiment, the number of subsequent instructions may be machine dependant. In one embodiment, the number of subsequent instructions may be specified by the same or another instruction, for example in an operand in the NIAI instruction or in a currently reserved instruction field.

Figure 8:
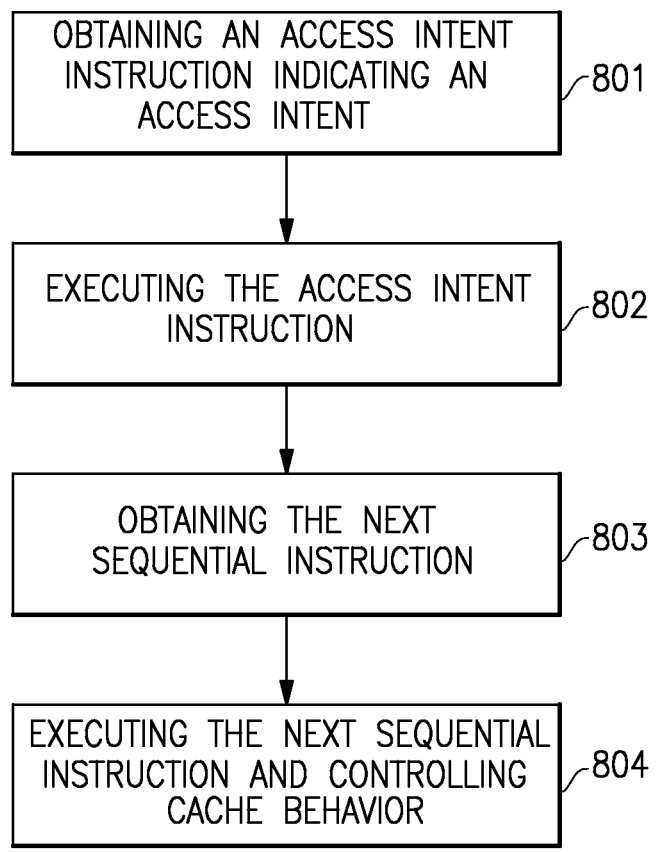
FIG. 8 illustrate an embodiment of a flow diagram according to an embodiment.

One embodiment of a flow diagram according to an embodiment is described with reference to FIG. 8. The CPU obtains an access intent instruction indicating an access intent, 801. The access intent may be associated with an operand of a next sequential instruction. The access intent may also indicate usage of the operand by instructions subsequent to the next sequential instruction. The CPU then executes the access intent instruction, 802. In one embodiment, the processor may remember the access intent by storing it internally, for example in internal memory or an internal control register. The CPU obtains the next sequential instruction, 803. The next sequential instruction is executed, and as part of the execution, the cache behavior, for example lower level cache behavior, is controlled based on the access intent in the access intent instruction, 804.

In one embodiment, the cache may be using a LRU replacement algorithm. Therefore, the cache behavior that is adjusted 804, depending on the access intent, may refer to updating or not updating the LRU/MRU table for the cache line (the state of the accessed cache line) during a cache hit. Typically, a cache hit would set the cache line into the MRU state. Not updating the LRU/MRU table would allow a cache line to move more quickly into the LRU position, if it isn't already there. This would allow the cache line to be overwritten or evicted on subsequent cache misses that bring in new lines from the higher level caches or main memory. In one embodiment, the cache line may be actively released from the local cache. In one embodiment, the LRU/MRU table may be updated to indicate LRU states other than MRU.

In one embodiment, this adjustment includes adjusting the cache during a cache miss. When the next sequential instruction is a store, typically an exclusive cache-line ownership is requested. When the next sequential instruction is a fetch, typically a read-only or a conditionally exclusive (CEX) cache-line ownership is requested. CEX, to the higher level cache, means that it can return read-only or exclusive cache line, depending on what provides better performance for the higher level cache In one embodiment, better performance for the higher level cache means, when no other CPU owns the cache line to give that cache line exclusively to the requesting CPU on a CEX, and if another CPU already has the cache line, then the requesting CPU gets it as a read-only, thus allowing both CPU's to share access to the cache line. By knowing the access intent of future instructions to store, fetches that miss the local cache may include requesting an exclusive ownership instead of conditional exclusive request.

In one embodiment, adjusting the cache line in a cache may include both adjustment embodiments stated above. In one embodiment, a different replacement algorithm than that of the LRU may be used by the cache.

In one embodiment, the lower level memory is a 6-way associative 96 KB cache. It may be accessed by two load or store instructions in every cycle, where each instruction has an associated access intent that may be specified by a prior NIAI.

An embodiment is described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, the embodiments may be embodied as a system, method or computer program product. Accordingly, the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the embodiment may take the form of a computer program product embodied in any tangible medium of expression having computer usable program code embodied in the medium.

Figure 9:
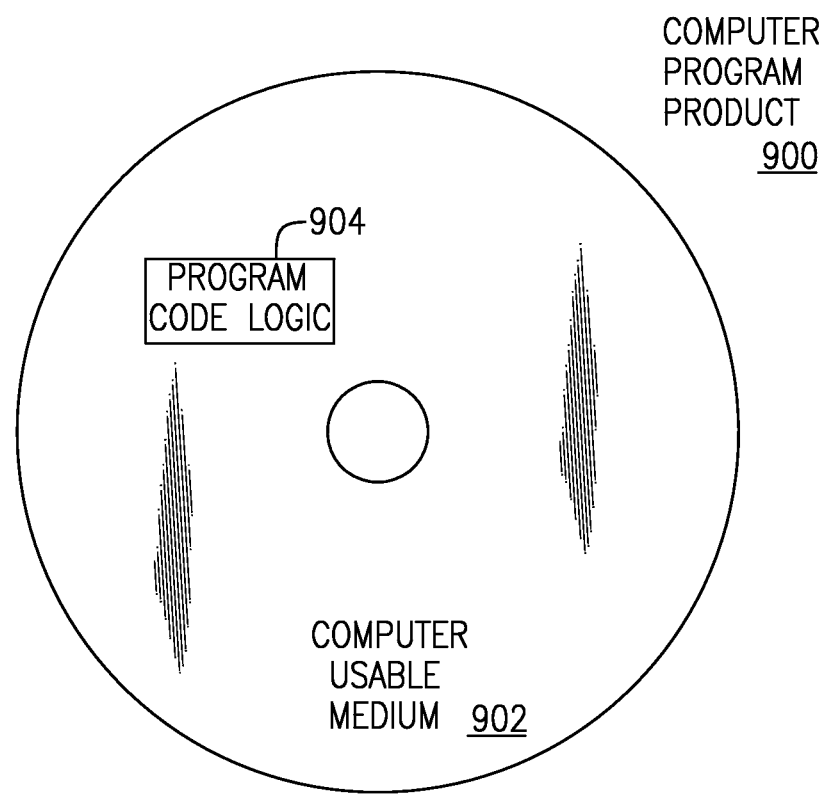
FIG. 9 illustrates one embodiment of a computer program product to incorporate one or more aspects of an embodiment.

One example of a computer program product incorporating one or more aspects of an embodiment is described with reference to FIG. 9. A computer program product 900 includes, for instance, one or more computer usable media 902 to store computer readable program code means or logic 904 thereon to provide and facilitate one or more aspects of an embodiment. Any combination of one or more computer usable or computer readable medium(s) may be utilized. The computer-usable or computer-readable medium may be, for example but not limited to, an electronic, magnetic, optical, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device. In the context of this document, a computer-usable or computer-readable medium may be any storage medium that can contain or store the program for use by or in connection with the instruction execution system, apparatus, or device.

Computer program code for carrying out operations of the embodiment may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 10:
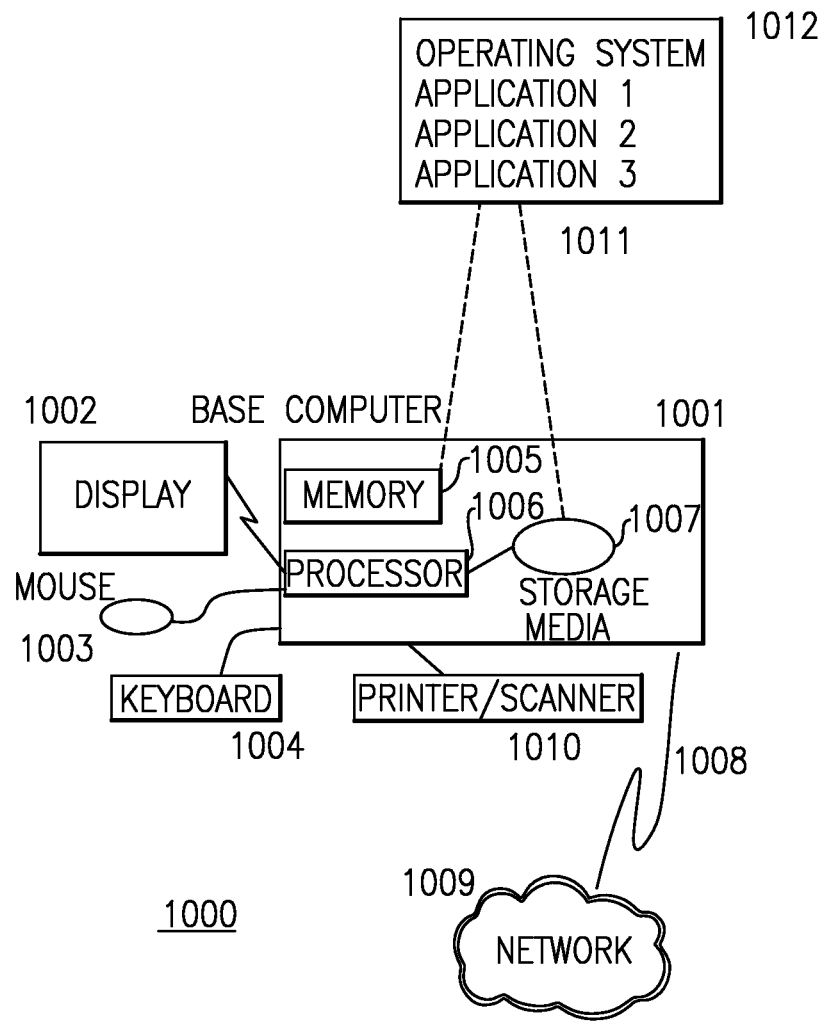
FIG. 10 illustrates one embodiment of a computer system.

FIG. 10 illustrates an embodiment of a workstation, server hardware system, in which an embodiment may be practiced. The system comprises a computer system 1001, such as a personal computer, a workstation, a server, a storage device, or host, including optional peripheral devices. The computer system 1001 includes one or more processors 1006 and a bus employed to connect and enable communication between the processor(s) 1006 and the other components of the computer system 1001 in accordance with known techniques. The bus connects the processor 1006 to memory 1005 and long-term storage 1007 which can include a hard drive (including any of magnetic media, CD, DVD and Flash Memory for example) or a tape drive for example. The computer system 1001 might also include a user interface adapter, which connects the microprocessor 1006 via the bus to one or more interface devices, such as a keyboard 1004, mouse 1003, a printer/scanner 1010 and/or other interface devices, which can be any user interface device, such as a touch sensitive screen, digitized entry pad, etc. The bus also connects a display device 1002, such as an LCD screen or monitor, to the microprocessor 1006 via a display adapter.

The computer system 1001 may communicate with other computers or networks of computers by way of a network adapter capable of communicating 1008 with a network 1009. For example, network adapters may include communications channels, token ring, Ethernet or modems. Alternatively, the computer system 1001 may communicate using a wireless interface, such as a CDPD (cellular digital packet data) card. The computer system 1001 may be associated with such other computers in a Local Area Network (LAN), VLAN, or a Wide Area Network (WAN), or the computer system 601 may be a client in a client/server arrangement with another computer, etc. All of these configurations, as well as the appropriate communications hardware and software, are known in the art.

Software programming code which embodies an embodiment may be typically accessed by the processor 1006 from long-term storage media 1007. The software programming code may be embodied on any of a variety of known media for use with a data processing system, as previously described above with reference to FIG. 9. The code may be distributed on such media, or may be distributed to users from the memory or storage of one computer system over a network to other computer systems.

Alternatively, the programming code 1011 may be embodied in the memory 1005, and accessed by the processor 1006 using the processor bus. Such programming code may include an operating system which controls the function and interaction of the various computer components and one or more application programs 1012. Program code may be normally paged from storage media 1007 to memory 1005 where it may be available for processing by the processor 1006. The techniques and methods for embodying software programming code in memory, on physical media, and/or distributing software code via networks are well known and will not be further discussed herein. The computer program product medium may be typically readable by a processing circuit preferably in a computer system for execution by the processing circuit.

Figure 11:
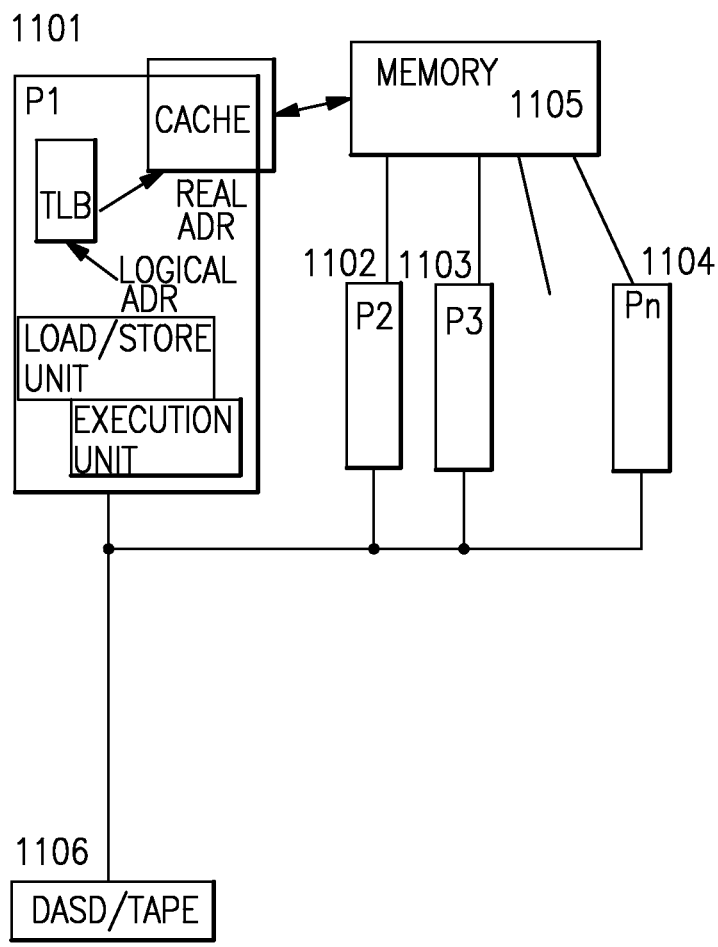
FIG. 11 illustrates one embodiment of a multi-processor system.

Referring to FIG. 11, an embodiment includes a plurality of n processors (P1 through Pn) 1101, 1102, 1103, 1104 sharing a memory 1105 each processor 1101 may include caches for caching memory operands, Load/Store units for accessing data in memory, Execution units for performing function of instructions based on the instruction opcode and Dynamic Address Translation (DAT) for translating virtual (logical) addresses into real (absolute) memory addresses including a TLB for caching DAT translations for improved performance. The processors may share peripheral devices 1006 (DASD/Tape) over a system bus or may have local peripheral devices.

The flow diagrams depicted herein are just examples. There may be many variations to these diagrams or the steps (or operations) described therein without departing from the spirit of the embodiment. For instance, the steps may be performed in a differing order, or steps may be added, deleted or modified. All of these variations are considered a part of the claimed embodiment.

While the preferred embodiment has been described, it will be understood that those skilled in the art, both now and in the future, may make various improvements and enhancements which fall within the scope of the claims which follow.

What is claimed is:

1. A computer-implemented method, said method comprising:

obtaining, by a computer, an access intent instruction, said access intent instruction comprising an access intent operand indicating an access intent for a specified storage operand as defined in a next sequential instruction, said access intent indicating usage of said storage operand by one or more instructions subsequent to said next sequential instruction;

executing, by said computer, said access intent instruction, said executing of said access intent instruction comprising signaling to a processor executing said access intent instruction the access intent indicated for the specified storage operand of said next sequential instruction;

obtaining, by said computer, said next sequential instruction; and executing, by said computer, said next sequential instruction, said executing of said next sequential instruction comprising:

based on said access intent, adjusting one or more actions directed at caching for said storage operand of said next sequential instruction, wherein:

a first value of the access intent operand signals to the processor that the storage operand of said next sequential instruction may or may not be accessed as an instruction operand by said one or more instructions subsequent to said next sequential instruction;

a second value of the access intent operand signals to the processor that the storage operand of said next sequential instruction will be accessed by said one or more instructions subsequent to said next sequential instruction for operand store access and may also be accessed for operand fetch access;

a third value of the access intent operand signals to the processor that the storage operand of said next sequential instruction will be accessed by said one or more instructions subsequent to said next sequential instruction for operand fetch access; and a fourth value of the access intent operand signals to the processor that the storage operand of said next sequential instruction will not be accessed as an instruction operand by said one or more instructions subsequent to said next sequential instruction.

2. The method according to claim 1, further comprising storing, by said computer, said access intent in an internal control register.

3. The method according to claim 1, wherein said access intent instruction indicates a second access intent, said second access intent being associated with a second storage operand of said next sequential instruction, said second access intent indicating usage of said second storage operand by said one or more instructions subsequent to said next sequential instruction.

4. The method according to claim 1, wherein based on said access intent, adjusting one or more actions directed at caching for said storage operand of said next sequential instruction further comprises:

based on said access intent being a first access intent, adjusting, by said computer, a recently used state of an accessed cache line to be at or near least recently used, and based on said access intent being a second access intent, not adjusting, by said computer, the recently used state of the accessed cache line to be most recently used.

5. The method according to claim 1, wherein based on said access intent, adjusting one or more actions directed at caching for said storage operand of said next sequential instruction further comprises:

based on a cache miss and said access intent, requesting, by said computer, a cache line to be read-only or exclusive from a next higher level cache.

6. The method according to claim 1, wherein said computer comprises said processor and a co-processor.

7. The method according to claim 1, wherein said one or more actions directed at caching comprise requesting a cache line.

8. The method according to claim 1, wherein said one or more actions directed at caching comprise modifying a recently used state of an accessed cache line.

* * * * *